US012782962B2

(12) United States Patent
Chen et al.

(10) Patent No.: US 12,782,962 B2
(45) Date of Patent: Nov. 3, 2026

(54) D-SHAPED ROBOT TURNING CONTROL METHOD BASED ON OBSTACLE CONTOUR

(71) Applicant: AMICRO SEMICONDUCTOR CO., LTD., Zhuhai (CN)

(72) Inventors: Zexin Chen, Zhuhai (CN); Zhuobiao Chen, Zhuhai (CN); Hewen Zhou, Zhuhai (CN)

(73) Assignee: AMICRO SEMICONDUCTOR CO., LTD., Zhuhai (CN)

( * ) Notice: Subject to any disclaimer, the term of this patent is extended or adjusted under 35 U.S.C. 154(b) by 7 days.

(21) Appl. No.: 19/086,662

(22) Filed: Mar. 21, 2025

(65) Prior Publication Data

US 2025/0216860 A1 Jul. 3, 2025

Related U.S. Application Data

(63) Continuation of application No. PCT/CN2023/135708, filed on Nov. 30, 2023.

(30) Foreign Application Priority Data

Jan. 6, 2023 (CN) ......................... 202310016065.4

(51) Int. Cl.
*G05D 1/628* (2024.01)
*G05D 1/242* (2024.01)
(Continued)

(52) U.S. Cl.
CPC ............. *G05D 1/628* (2024.01); *G05D 1/242* (2024.01); *G05D 2105/10* (2024.01); *G05D 2111/17* (2024.01)

(58) Field of Classification Search
CPC ........ G05D 1/242; G05D 1/622; G05D 1/628; G05D 2101/20; G05D 2105/10;
(Continued)

(56) References Cited

U.S. PATENT DOCUMENTS

2008/0191653 A1* 8/2008 Han .......................... A47L 9/00 701/25
2008/0306680 A1 12/2008 Marty et al.
(Continued)

FOREIGN PATENT DOCUMENTS

CN 107283420 A 10/2017
CN 109426264 A 3/2019
(Continued)

OTHER PUBLICATIONS

First Office Action issued in counterpart Chinese Patent Application No. 202310016065.4, dated Nov. 23, 2024.
(Continued)

*Primary Examiner* — Brandon Z Willis
(74) *Attorney, Agent, or Firm* — Westbridge IP LLC

(57) ABSTRACT

A turning control method for a D-shaped robot based on an obstacle contour includes: Step S1: extracting, by the D-shaped robot, a linear contour of an obstacle in front of the D-shaped robot using a line laser sensor, and calculating a rotation angle for turning a side edge of a head of the D-shaped robot to be parallel to the linear contour based on the linear contour; Step S2: calculating an edge distance to be adjusted for the head before turning based on the rotation angle and a body size parameter of the D-shaped robot; and Step S3: adjusting a position of the D-shaped robot based on the edge distance, and making a turn based on the rotation angle until the side edge of the head is parallel to the linear contour.

15 Claims, 5 Drawing Sheets

(51) Int. Cl.
*G05D 105/10* (2024.01)
*G05D 111/10* (2024.01)

(58) Field of Classification Search
CPC ........... G05D 2107/40; G05D 2109/13; G05D 2109/135; G05D 2109/10; G05D 2111/10; G05D 2111/17; G01C 21/206; A47L 11/24; A47L 11/20; A47L 11/40; A47L 11/4061; A47L 11/4008; A47L 2201/00; A47L 2201/04
See application file for complete search history.

(56) References Cited

U.S. PATENT DOCUMENTS

| | | | | |
|---|---|---|---|---|
| 2016/0320778 | A1 | 11/2016 | Alexander et al. | |
| 2017/0156560 | A1* | 6/2017 | Jung | A47L 9/2805 |
| 2017/0325647 | A1* | 11/2017 | Kwak | A47L 9/009 |
| 2021/0154840 | A1 | 5/2021 | Vogel et al. | |
| 2021/0321854 | A1 | 10/2021 | Zhang et al. | |
| 2022/0248930 | A1* | 8/2022 | Li | A47L 11/4097 |

FOREIGN PATENT DOCUMENTS

| | | | |
|---|---|---|---|
| CN | 209404657 | U | 9/2019 |
| CN | 110888443 | A | 3/2020 |
| CN | 111433697 | A | 7/2020 |
| CN | 112148005 | A | 12/2020 |
| CN | 112269383 | A | 1/2021 |
| CN | 114587208 | A | 6/2022 |
| CN | 114879663 | A | 8/2022 |
| CN | 114983293 | A | 9/2022 |
| CN | 217891022 | U | 11/2022 |

OTHER PUBLICATIONS

International Search Report issued in corresponding PCT Application No. PCT/CN2023/135708, dated Mar. 8, 2024.

European Search Report issued in counterpart European Patent Application No. EP 23914445.4, dated Nov. 14, 2025.

* cited by examiner

D-SHAPED ROBOT TURNING CONTROL METHOD BASED ON OBSTACLE CONTOUR

CROSS-REFERENCE TO RELATED APPLICATIONS

The present application is a continuation of International Application No. PCT/CN2023/135708, filed on Nov. 30, 2023, which claims priority to Chinese Patent Application No. 202310016065.4, filed on Jan. 6, 2023. The disclosures of the above-mentioned applications are hereby incorporated by reference in their entireties.

TECHNICAL FIELD

The present disclosure relates to the field of robotics, in particular to a turning control method for a D-shaped robot based on an obstacle contour.

BACKGROUND

A sweeping robot, also known as automatic sweeper, smart vacuum cleaner or robot vacuum cleaner, is one kind of smart household appliances that can automatically clean floor in a room with the help of certain artificial intelligence. Generally, a brushing mode or a vacuuming mode is used to absorb debris on the floor into its own garbage storage box to achieve a floor cleaning function. Generally speaking, robots for cleaning, vacuuming and mopping are collectively called as sweeping robot. Currently, the sweeping robots are roughly divided into round sweeping robots and D-shaped sweeping robots. An overall shape of the D-shaped sweeping robot is a combination of a circle and a rectangle.

In a case that the D-shaped sweeping robot detects a wall in front of the robot, it selects to make a turn directly in order to move along a contour line of the wall. However, due to a limited adjustable space for a head of the D-shaped sweeping robot, a protrusion at a front edge of the D-shaped sweeping robot (e.g., a protruding structure at a junction of the front edge and a right edge) is prone to collide with the wall.

SUMMARY

An object of the present disclosure is to provide a turning control method for a D-shaped robot based on an obstacle contour. A specific technical solution is provided as follows.

The present disclosure provides in some embodiments a turning control method for a D-shaped robot based on an obstacle contour, including: Step S1 of extracting, by the D-shaped robot, a linear contour of an obstacle in front of the D-shaped robot using a line laser sensor, and calculating a rotation angle for turning a side edge of a head of the D-shaped robot to be parallel to the linear contour based on the linear contour; Step S2 of calculating an edge distance to be adjusted for the head before turning based on the rotation angle and a body size parameter of the D-shaped robot, wherein the edge distance is a difference between a linear distance from a rotation center for turning the D-shaped robot to the linear contour and a linear distance from the rotation center to a front end of the head in a direction perpendicular to the linear contour; and Step S3 of adjusting a position of the D-shaped robot based on the edge distance, and making a turn based on the rotation angle until the side edge of the head is parallel to the linear contour.

DETAILED DESCRIPTION OF THE EMBODIMENTS

The present disclosure will be described hereinafter in conjunction with the drawings and embodiments. In the following description, for the purpose of explanation rather than limitation, specific details, such as a particular system structure and techniques, are provided to facilitate the thorough understanding of the embodiments of the present disclosure. However, it should be appreciated that, the present disclosure may also be implemented in other embodiments without these specific details. In other cases, detailed description about well-known systems, devices, circuits and methods are omitted to avoid the description from being obscured by unnecessary details.

It should be appreciated that, the term "include/including" used in the embodiments of the present disclosure indicates the presence of the described features, entities, steps, operations, elements, and/or components, but does not exclude the presence or addition of one or more other features, entities, steps, operations, elements, components, and/or combinations thereof. It should be further appreciated that, the term "and/or" used in the embodiments of the present disclosure refers to any combination of one or more of the listed items and all possible combinations.

As used in the embodiments of the present disclosure, the term "if" may, depending on the context, be interpreted as "in a case that", "once", "in response to determining" or "in response to detecting". Similarly, the expression "if it is determined" or "if [a described condition or event] is detected" may, depending on the context, be interpreted as "once it is determined", "in response to determining", "once [the described condition or event] is detected" or "in response to detecting [the described condition or event]".

In addition, in the description in the embodiments of the present disclosure, such words as "first", "second" and "third" are merely used to differentiate different components rather than to represent any importance. Such expressions as "one embodiment" and "some embodiments" intend to indicate that specific features, structures or characteristics are contained in at least one embodiment of the present disclosure. Hence, unless otherwise defined, the expressions such as "in one embodiment", "in some embodiments" and "in some other embodiments" do not necessarily refer to the same embodiments but indicate "one or more, but not all, embodiments". The terms "include", "including" and the variations thereof mean "include but not limited to", unless otherwise defined.

Figure 1:
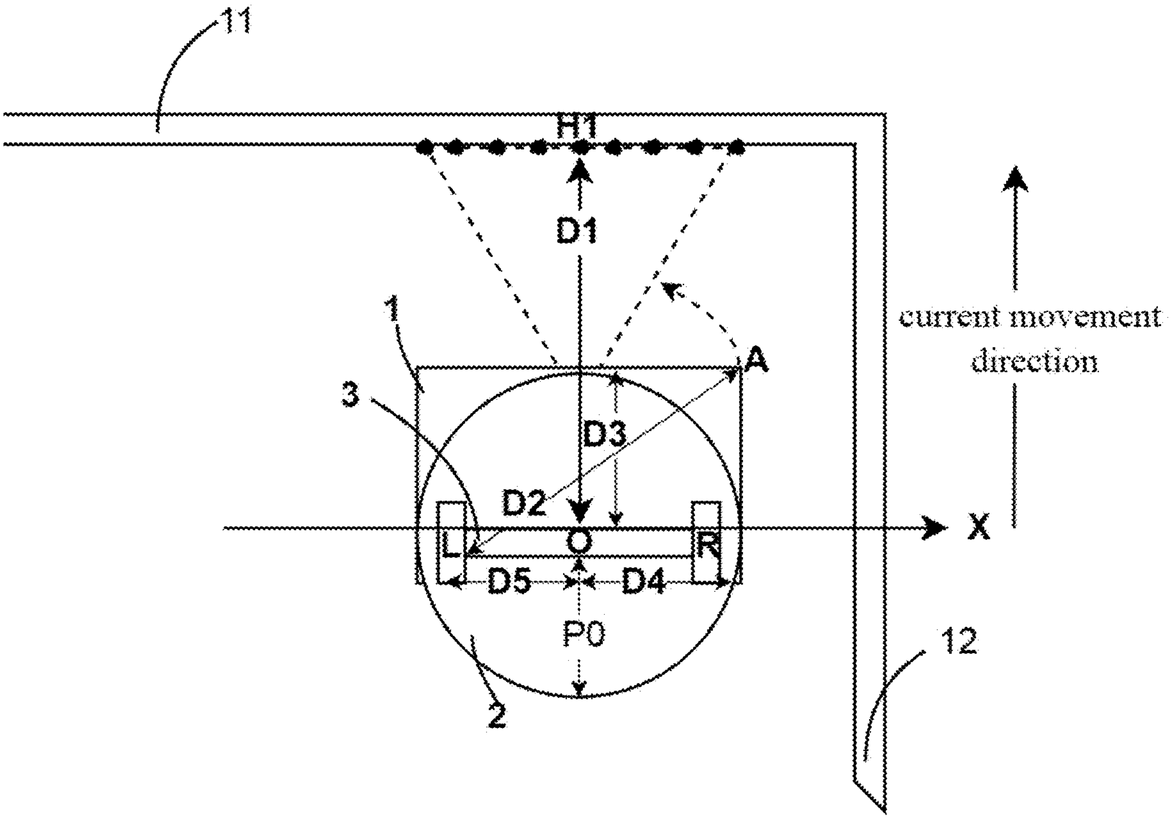
FIG. 1 is a schematic view showing a situation where a D-shaped robot moves toward an obstacle 11 along a current movement direction according to an embodiment of the present disclosure, where a linear contour of the obstacle 11 is perpendicular to the current movement direction, and the D-shaped robot needs to rotate by a rotation angle of 90° relative to the current movement direction so that a right edge of a head of the D-shaped robot is parallel to the linear contour where H1 is located.

In a case that a D-shaped robot consisting of a head 1 and a body 2 in FIG. 1 makes a turn to move along a wall, a protrusion A at a right edge (a protrusion at a junction of a front edge and the right edge of the head 1) easily collides with the wall. Hence, in a case that the D-shaped robot detects a linear obstacle or a linear contour of an obstacle in a current movement direction, the D-shaped robot needs to adjust an edge distance (usually a linear distance between a front end of the head and a corresponding point on the linear obstacle or linear contour) and set a rotation angle, so as to move backward and make a turn, thereby to prevent the protrusion from colliding with the obstacle. It should be appreciated that, the linear obstacle may be a wall, a box or a doorsill, and the linear contour of the obstacle may be a part of a contour line of the wall, the box or the doorsill. In a case that the D-shaped robot moves close to this kind of obstacle, a line laser sensor arranged at a front end of the D-shaped robot collects point clouds in the movement direction, and identifies the obstacle as a linear obstacle (in a case that the entire obstacle is detected) or a linear contour of the obstacle (in a case that a part of the obstacle is detected) through fitting, or even both the linear contour and a curved contour. The linear obstacle includes the linear contour, and the linear contour is detected.

The present disclosure provides in some embodiments a turning control method for a D-shaped robot based on an obstacle contour, and the turning control method is executed by the D-shaped robot consisting of a head 1 and a body 2 in FIGS. 1 to 4. Specifically, as shown in FIGS. 1 to 4, the D-shaped robot substantially includes the head 1 of a rectangular shape and the body 2 of a semicircular shape. At least one line laser sensor is arranged at a front end of the head 1. A plurality of line laser sensors is arranged sequentially from a center of a front edge of the head 1 to both sides. The rectangular head 1 is spaced apart from the semicircular body 2 by a wheel axle 3 which serves as a boundary between the rectangular head and the semicircular body. In this embodiment of the present disclosure, as shown in FIG. 1, the turning control method includes the following steps.

Step S1: extracting, by the D-shaped robot, a linear contour of an obstacle in front of the D-shaped robot using a line laser sensor, and calculating a rotation angle for turning a side edge of the head of the D-shaped robot to be parallel to the linear contour based on the linear contour. The linear contour of the obstacle may be a part of a contour of a linear obstacle, or a complete linear obstacle that has been detected. In a case that the D-shaped robot selects to move along a linear contour of an obstacle on the left, it may make a turn so that a left edge of the head is parallel to the linear contour, and at this time, it may rotate to the right by the rotation angle. In a case that the D-shaped robot selects to move along a linear contour of an obstacle on the right, it may make a turn so that a right edge of the head is parallel to the linear contour, and at this time, it may rotate to the left by the rotation angle.

Step S2: calculating an edge distance to be adjusted for the head before turning based on the rotation angle and a body size parameter of the D-shaped robot. In other words, in order to enable the side edge of the head to be parallel to the linear contour, the D-shaped robot needs to move forward or backward before turning, so as to control the edge distance for the head relative to the liner contour of the obstacle. In this embodiment of the present disclosure, the edge distance is calculated based on a rotation center for turning the D-shaped robot, and the edge distance is a difference between a linear distance from the rotation center to the linear contour and a linear distance from the rotation center to the front end of the head in a direction perpendicular to the linear contour.

It should be appreciated that, a direction perpendicular to the wheel axle is parallel to a central axis or a current movement direction of the D-shaped robot.

In this embodiment of the present disclosure, in order to control the rotation conveniently, a wheel at one side of the D-shaped robot is selected as the rotation center for turning, and a shortest distance between the rotation center and the linear contour is a linear distance, i.e., a perpendicular distance, from the rotation center to the linear contour in the direction perpendicular to the linear contour. The linear distance from the rotation center to the front end of the head is a linear distance occupied by the head of the D-shaped robot in the direction perpendicular to the linear contour.

Step S3: adjusting a position of the D-shaped robot based on the edge distance, and making a turn based on the rotation angle until the side edge of the head is parallel to the linear contour. The adjusting the position further includes adjusting a distance between a side edge of the D-shaped robot and a side obstacle, and the distance is calculated based on the body size parameter of the D-shaped robot. Hence, in Step S3, the D-shaped robot adjusts its current position based on the edge distance for the head obtained in Step S2 to prevent a convex point of the head (e.g., a point A) from colliding with the obstacle in front of the D-shaped robot (including the linear contour) during the turning. Then, the D-shaped robot makes a turn based on the rotation angle obtained in Step S1.

After the turning by the rotation angle, in a case that the D-shaped robot continues to detect a linear contour of a same type in the movement direction, it may make a turn using Steps S1 to S3 so that the side edge of the head is parallel to the linear contour. Based on the above, the D-shaped robot moves along the linear obstacle or the linear contour of the obstacle, i.e., moves against a wall. During the movement, the D-shaped robot controls the protrusion at the front end not to collide with a non-linear obstacle or a curved contour based on information about the obstacle obtained by the line laser sensor, e.g., controls the protrusion to avoid a point on the contour of the obstacle closest to the head.

Figure 2:
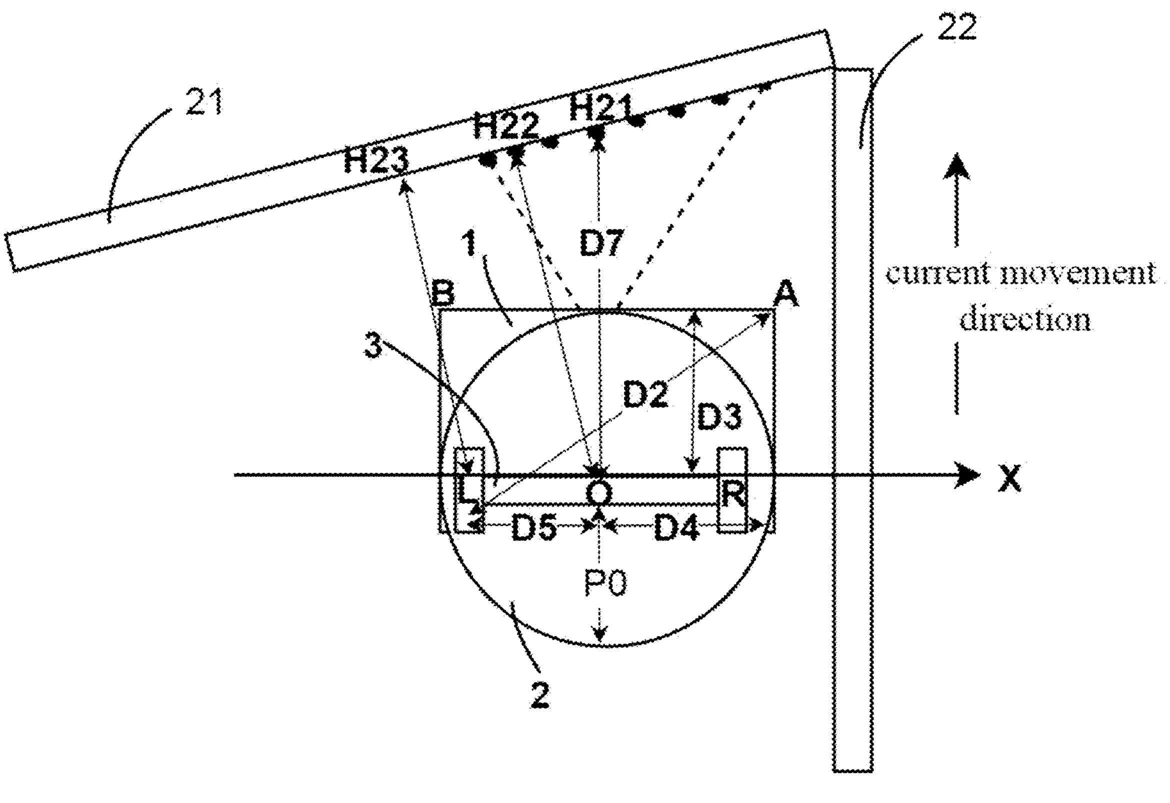
FIG. 2 is a schematic view showing a situation where the D-shaped robot moves toward an obstacle 21 along a current movement direction according to an embodiment of the present disclosure, where an extension direction of a linear contour of the obstacle 21 is angled relative to the current movement direction of the D-shaped robot by an acute angle, the D-shaped robot needs to rotate by an obtuse rotation angle relative to the current movement direction so that the right edge of the head of the D-shaped robot is parallel to the linear contour where H23, H22 and H21 are located, and an X-axis direction is perpendicular to the current movement direction.
Figure 3:
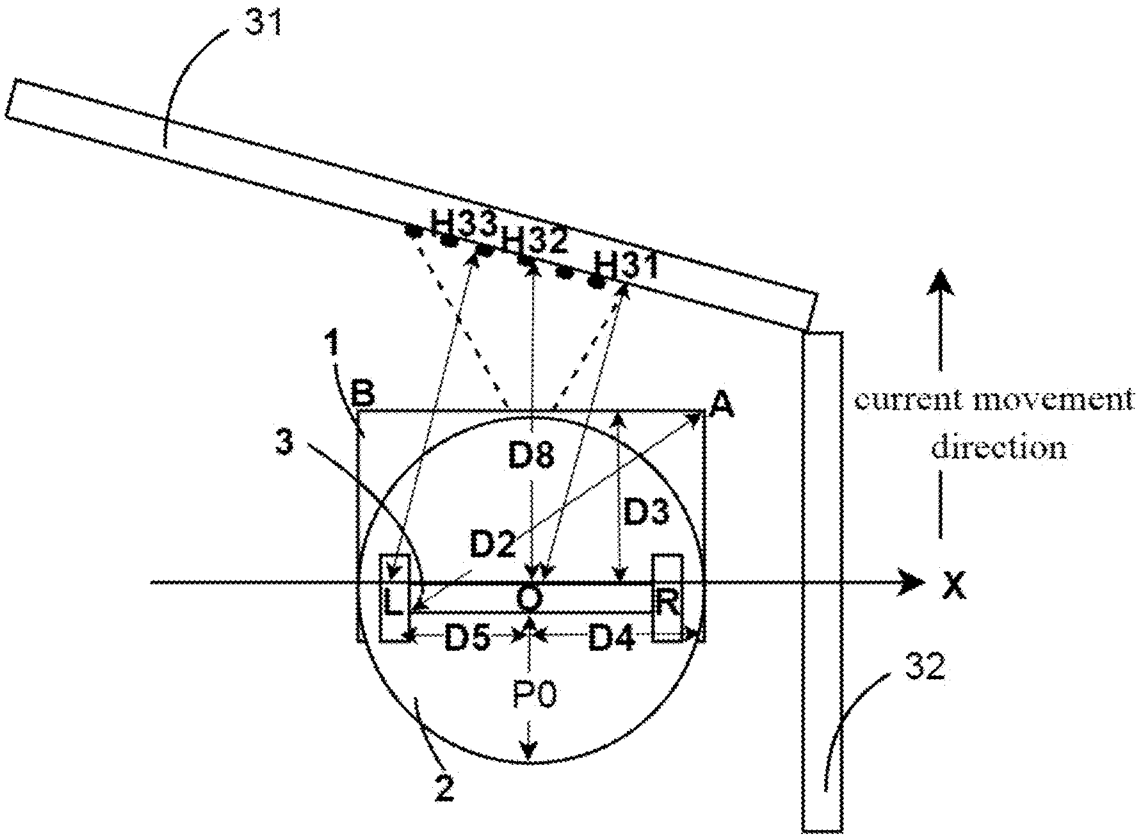
FIG. 3 is a schematic view showing a situation where the D-shaped robot moves toward an obstacle 31 along a current movement direction according to an embodiment of the present disclosure, where an extension direction of a linear contour of the obstacle 31 is angled relative to the current movement direction of the D-shaped robot by an obtuse angle, the D-shaped robot needs to rotate by an acute rotation angle relative to the current movement direction so that the right edge of the head of the D-shaped robot is parallel to the linear contour where H33, H32 and H31 are located, and an X-axis direction is perpendicular to the current movement direction.

In this embodiment of the present disclosure, with reference to FIGS. 1 to 4, the D-shaped robot includes the rectangular head 1, the semicircular body 2 and two symmetrical wheels L and R. The wheels L and R are coupled to each other via the wheel axle 3. The wheels L and R are rotatably assembled at left and right ends of the wheel axle 3 respectively, that is, the wheels L and R are arranged at corresponding assembling positions along a boundary between the head 1 and the body 2, and the wheel axle 3 is arranged at the boundary between the head 1 and the semicircular body 2. The two wheels include the wheel L close to the side obstacle and the wheel R away from the side obstacle. In FIG. 1, for the D-shaped robot, the side obstacle is obstacle 12, and the obstacle in front of the D-shaped robot whose linear contour is extracted is linear obstacle 11. In FIG. 2, for the D-shaped robot, the side obstacle is obstacle 22, and the obstacle in front of the D-shaped robot whose linear contour is extracted is linear obstacle 21. In FIG. 3, for the D-shaped robot, the side obstacle is obstacle 32, and the obstacle in front of the D-shaped robot whose linear contour is extracted is linear obstacle 31.

As shown in FIGS. 1 to 4, a body center O of the D-shaped robot is a center O of the wheel axle 3, and the convex point A at one side of the head 1 of the D-shaped robot is a vertex at one side of the front end of the head 1. The front end of the head 1 is an end pointing to the current movement direction of the D-shaped robot, and the current movement direction is indicated by an arrow in the drawings. A width of the semicircular body is equal to a length of an edge of the head 1 parallel to the wheel axle 3, and is also twice a length of D4. A maximum perpendicular distance between an edge of the semicircular body 2 and the wheel axle 3 is a maximum radius of the body, that is, a linear distance between a point on a lower edge of the semicircular body 2 furthest away from the center O of the wheel axle 3 and the center O. In FIGS. 1 to 3, P0 represents the maximum radius of the body, i.e., a radius of a circle where the body 2 is located, and the maximum radius of the body is greater than or equal to a half of the width of the body, i.e., D4.

In this embodiment of the present disclosure, a rotation center for the D-shaped robot to turn left is at the assembling position where the left wheel is located, or a rotation center for the D-shaped robot to turn right is at the assembling position where the right wheel is located. Referring to FIG. 1, the side obstacle 12 is located at a right side of the D-shaped robot, so the rotation center for the D-shaped robot to turn left is at the assembling position where the left wheel L is located. At this time, the right wheel R is a wheel arranged at a side of the head 1 close to the side obstacle 12, and the left wheel L is a wheel arranged at a side of the head 1 away from the side obstacle 12. In some other embodiments of the present disclosure, in a case that the rotation center for the D-shaped robot to turn right is at the position where the right wheel is located, the right wheel R is a wheel arranged at a side of the head 1 close to the side obstacle, and the wheel left L is a wheel arranged at a side of the head 1 away from the side obstacle. Hence, in this embodiment of the present disclosure, the right wheel R or the left wheel L is preferentially set as the rotation center. In some other embodiments of the present disclosure, the body center O may also be selected as the rotation center. In addition, the perpendicular distance from the rotation center to the front end of the head is set as a maximum radius D3 of the head, as shown in FIGS. 1 to 3. In this embodiment of the present disclosure, the body size parameter of the D-shaped robot includes the body center O, the length of the wheel axle 3, the width of the body, the maximum radius P0 of the body, the maximum radius D3 of the head, a distance between the body center O of the D-shaped robot and the convex point at one side of the head, and a distance between the rotation center and the convex point at one side of the head.

In some embodiments of the present disclosure, the body 2 has a circular shape. After the body 2 is assembled with the rectangular head 1, a portion of the body 2 at left and right sides is cut off so that its edges are attached to left and right edges of the head 1 respectively. The body 2 has a semicircular structure outside the head 1 in a direction opposite to the movement direction of the D-shaped robot. The body 2 is a rear part of a frame of the D-shaped robot, and the head 1 is a front part of the frame of the D-shaped robot. The body 2 is a circular structure with a portion at both sides being cut off, so the body center O of the D-shaped robot is a center of the circular body 2 before cutting. The vertex at one side of the head of the D-shaped robot is a vertex at a front side of the rectangular head 1. A midpoint of the wheel axle may be set as the center of the circular body 2, and a linear distance between a vertex A at a right side of the head of the D-shaped robot and the body center O of the D-shaped robot is set as a maximum radius of the D-shaped robot, i.e., a longest distance from the midpoint O of the wheel axle to a boundary of the head 1 of the D-shaped robot. In a case that the head 1 and the body 2 of the D-shaped robot are combined into one piece, the maximum radius of the D-shaped robot is equivalent to the longest distance from the midpoint of the wheel axle to the boundary of the head 1 of the D-shaped robot. The word "front" refers to the movement direction of the D-shaped robot, i.e., a direction indicated by the arrow in the drawings.

Based on the above, the D-shaped robot may make a turn by taking the assembling position of the wheel at a side away from the side obstacle as the rotation center, and taking a sum of a linear distance between the wheel at a side away from the side obstacle and the convex point at a side of the head of the D-shaped robot close to the side obstacle and a preset distance as a rotation radius. In a possible embodiment of the present disclosure, the rotation radius is used to represent the longest linear distance from the body center O of the D-shaped robot to the boundary of the head 1 of the D-shaped robot. In this way, it is able to prevent the convex point at a side of the head of the D-shaped robot from being blocked by the obstacle at a position closest to the convex point, thereby to prevent the head of the D-shaped robot from colliding with the obstacle due to a limited adjustment space.

In some embodiments of the present disclosure, the radius of the semicircular body 2 is represented by a perpendicular distance D4 from the body center O of the D-shaped robot to a side edge of the head 1 of the D-shaped robot (an intersection of a right edge of the rectangular head 1 and the X-axis which is perpendicular to the right edge). The perpendicular distance is equal to a half of a width of the body or a half of a width of the head, and the side edge of the rectangular head 1 is perpendicular to the wheel axle. As shown in FIG. 1, a linear distance between the body center O of the D-shaped robot and a center of a bottom edge of the body 2 of the D-shaped robot is used to represent the maximum radius of the body of the D-shaped robot, and the maximum radius of the body of the D-shaped robot is greater than a half of the width of the body or a half of the width of the head. In a possible embodiment of the present disclosure, a half of the width of the body is 156.25 mm, and the maximum radius of the body 2 of the D-shaped robot is 163.5 mm. Through setting a corresponding edge distance (including a distance between the head and the obstacle), it is able to prevent the body 2 from colliding with the side obstacle 12 in a case that the body 2 rotates in a direction away from the side obstacle 12.

In some embodiments of the present disclosure, the body center O of the D-shaped robot may be the center of the wheel axle of the D-shaped robot. The center of wheel axle of the D-shaped robot is a midpoint of the boundary between the body 2 and the head 1 of the D-shaped robot. In a case that a universal wheel is arranged in the middle of the body 2 of the D-shaped robot, two wheels may be arranged at two sides of the head 1 respectively. In a case that the two wheels rotate at different speeds, the D-shaped robot may make a turn. Through adjusting the distance between the vertex at one side of the head of the D-shaped robot and the obstacle, or adjusting the distance between the wheel at one side of the body and the obstacle, the vertex A at one side of the head 1 does not collide with the obstacle during the rotation. A rotation speed of the wheel at a side close to the obstacle is greater than that of the wheel at a side away from the obstacle, so as to drive the D-shaped robot to rotate around the rotation center in a clockwise or counterclockwise direction by a certain angle, thereby to avoid the obstacle or enable the side edge to be parallel to the linear contour of the obstacle.

In a possible embodiment of the present disclosure, at least one roller is arranged at a base of the D-shaped robot, and the roller is located at the front end of the head 1 and rotates around a direction parallel to the ground to clean the ground. The two symmetrical wheels of the D-shaped robot may be arranged on the rectangular head 1, so as to form a three-point support with the universal wheel arranged on the semicircular body 2 to support the D-shaped robot. To be specific, an overall center of gravity of the D-shaped robot is located on a rotation axis of the two wheels (i.e., an axis where the wheel axle is located), so that an orthogonal projection of the body center onto the base coincides with an orthogonal projection of the overall center of gravity onto the base. The overall center of gravity of the D-shaped robot may also be located in a region between the wheel axle and the universal wheel but at a position closer to the wheel axle 3.

In an embodiment of the present disclosure, Step S1 includes obtaining, by the D-shaped robot, point cloud data of the obstacle in front of the D-shaped robot via the line laser sensor, and performing linear fitting on the point cloud data using a least square method to obtain the linear contour. The linear contour is a straight line representing a position of the obstacle in front of the D-shaped robot. In this way, it is able to determine a position of the linear contour of the obstacle and an extension direction of the linear contour (which is further used to calculate a slope) within a detection range, thereby to determine the position of the obstacle. In FIG. 1, coordinates of a point H1 and position information about the linear contour including the point H1 (a line perpendicular to a line OH1) are determined, so as to obtain position information about the linear obstacle in front of the D-shaped robot. In FIG. 2, coordinates of a point H22 and coordinates of a point H21 within the detection range, and position information about the linear contour including the point H22, the point H21 and other detected point clouds are determined, so as to obtain position information about the linear obstacle in front of the D-shaped robot. In FIG. 3, coordinates of a point H32 and coordinates of a point H33 within the detection range, and position information about the linear contour including the point H32, the point H33 and other detected point clouds are determined, so as to obtain position information about the linear obstacle in front of the D-shaped robot.

Then, an angle between a vertical line perpendicular to the liner contour and a positive direction of the X-axis is set as the rotation angle for turning a side edge of the head of the D-shaped robot to be parallel to the linear contour. In a possible embodiment of the present disclosure, in a laser map generated by the D-shaped robot, the vertical line is perpendicular to the positive direction of the X-axis of the laser map, and a deflection angle of the vertical line is used to represent the rotation angle of the D-shaped robot. The positive direction of the X-axis is parallel to the wheel axle. In some other embodiments of the present disclosure, the direction perpendicular to the wheel axle may also be used as the positive direction of the X-axis. Here, the positive direction of the X-axis is used to indicate an angular feature on the linear contour for angle measurement, rather than an absolute direction. The positive direction of the X-axis may change along with a change in a map coordinate system to be generated by the D-shaped robot.

Figure 4:
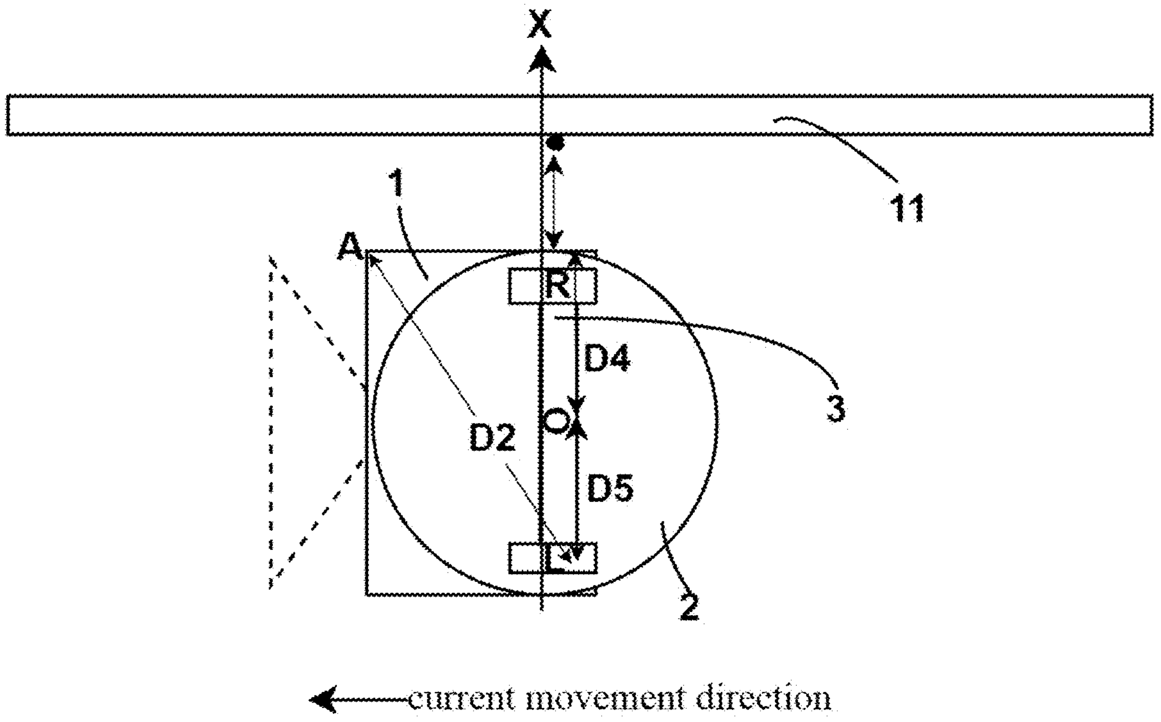
FIG. 4 is a schematic view showing a situation where the right edge of the head of the D-shaped robot is parallel to a linear contour of a side obstacle according to an embodiment of the present disclosure, where an X-axis direction is perpendicular to a current movement direction of the D-shaped robot, and the current movement direction is perpendicular to a linear contour of a side obstacle.
Figure 5:
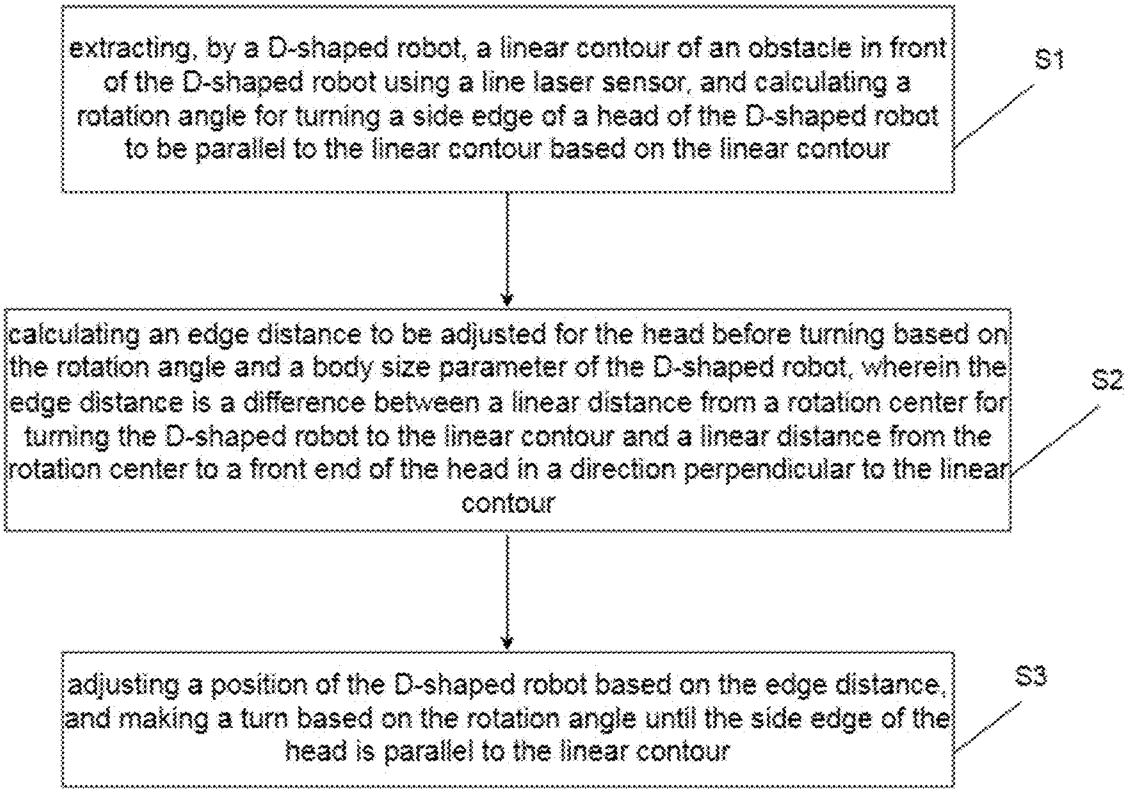
FIG. 5 is a flow chart of a turning control method for a D-shaped robot based on an obstacle contour according to an embodiment of the present disclosure.

In FIG. 1, the vertical line perpendicular to the linear contour is OH1, an angle between OH1 and the positive direction of the X-axis is equal to 90°, and a direction that faces the side obstacle 12 and is perpendicular to the side edge of the head 1 of the D-shaped robot is taken as the positive direction of the X-axis. In FIG. 2, the vertical line perpendicular to the linear contour is OH22, an angle between OH22 and the positive direction of the X-axis is greater than 90°, and a direction that faces the side obstacle 22 and is perpendicular to the side edge of the head 1 of the D-shaped robot is taken as the positive direction of the X-axis. In FIG. 3, the vertical line perpendicular to the linear contour is OH31, an angle between OH31 and the positive direction of the X-axis is less than 90°, and a direction that faces the side obstacle 32 and is perpendicular to the side edge of the head 1 of the D-shaped robot is taken as the positive direction of the X-axis. In FIG. 4, the side edge of the head of the D-shaped robot is parallel to the linear contour, and the linear contour is perpendicular to the positive direction of the X-axis. The linear contour is extracted from the obstacle 11 in FIG. 1, the obstacle 21 in FIG. 2, or the obstacle 31 in FIG. 3. It should be appreciated that, a current sweeping robot mainly focuses on a right edge, so in FIGS. 1 to 4, the description is given by taking the obstacle at the right side as an example.

It should be appreciated that, the D-shaped robot obtains information about the distance between the body center O and a point of the obstacle closest to the center body O via the line laser sensor arranged at the front end, so a length of the vertical line perpendicular to the linear contour is taken as a distance between the linear obstacle in from of the D-shaped robot and the D-shaped robot. Of course, in a case that an assembling angle of the line laser sensor in the D-shaped robot changes, distance information about the points distributed at a corresponding detection angle in the linear contour may be obtained, so as to obtain the position information about the linear contour on the map.

In some embodiments of the present disclosure, in Step S1, the linear fitting is performed on the point cloud data using the least square method to obtain positions of lines representing the obstacles in front of the D-shaped robot as shown in FIGS. 1 to 3, i.e., a position of a line segment perpendicular to OH1 in the obstacle 11, a position of a line segment between H22 and H21, and a position of a line segment between H32 and H33. The obstacles are all linear obstacles, but angles of the line segments relative to the positive direction of the X-axis are different. In a possible embodiment of the present disclosure, whether or not the obstacle in front of the D-shaped robot is a linear obstacle or a non-linear obstacle (an obstacle with a curved contour line) may be determined based on a length threshold. For example, in a case that a length of the line segment obtained through fitting is greater than the length threshold, it is determined that the collected point cloud data comes from a linear obstacle, that is, the obstacle in front of the D-shaped robot is a linear obstacle, such as a wall, a box or a doorsill. In a possible embodiment of the present disclosure, in a case that the length of the line segment obtained through fitting is less than the length threshold, it is determined that the collected point cloud data does not come from a linear obstacle, that is, the obstacle in front of the D-shaped robot is not a linear obstacle, i.e., it is a non-linear obstacle.

Based on Step S1, the angle between the linear contour and the positive direction of the X-axis is calculated as follows. A slope of the linear contour is calculated based on any two points on the linear contour, and then the slope of the linear contour is converted into the angle between the linear contour and the positive direction of the X-axis using an arctangent function. In FIG. 2, the two points H22 (x0, y0) and H21 (x1, y1) on the linear contour that represents the position of the obstacle 22 are substituted into a preset formula $a=\arctan((y1-y0)/(x1-x0))$ to calculate an angle a between the linear contour and the positive direction of the X-axis. A right angle is added to, or subtracted from, the angle a between the linear contour and the positive direction of the X-axis to obtain an angle between the vertical line perpendicular to the linear contour and the positive direction of the X-axis, e.g., an angle H22Ox between OH22 and the positive direction of the X-axis.

Specifically, the angle between the vertical line and the positive direction of the X-axis is a first detection angle, and the angle between the linear contour and the positive direction of the X-axis is a second detection angle.

In a case that the second detection angle is an obtuse angle, the first detection angle is obtained by subtracting 90° from the second detection angle. In FIG. 3, the second detection angle is the angle between the linear contour H31H33 and the positive direction of the X axis, and the first detection angle is an angle H31Ox between the vertical line OH31 and the positive direction of the X axis. Based on a triangular geometric relationship (e.g., a relationship between an interior angle and an exterior angle of a triangle), H31Ox has a value obtained by subtracting 90° from the second detection angle.

In a case that the second detection angle is an acute angle, the first detection angle is a sum of the second detection angle and 90°. In FIG. 2, the second detection angle is an angle between the linear contour H21H23 and the positive direction of the X-axis, and the first detection angle is an angle H22Ox between the vertical line OH22 and the positive direction of the X-axis. Based on a triangular geometric relationship (e.g., a relationship between an interior angle and an exterior angle of a triangle), the angle H22Ox has a value equal to a sum of the second detection angle and 90°.

In a case that the linear contour is parallel to the positive direction of the X-axis, the first detection angle is equal to 90°. In FIG. 1, the second detection angle is an angle between a line where the linear contour H1 is located and the positive direction of the X-axis, and the first detection angle is an angle H1Ox between the vertical line OH1 and the positive direction of the X-axis. Based on a triangular geometric relationship (e.g., a relationship between an interior angle and an exterior angle of a triangle), the angle H1Ox has a value equal to a sum of the second detection angle (0°) and 90°, or a value obtained by subtracting 90° from the second detection angle (180°).

In an embodiment of the present disclosure, in Step S3, the making a turn based on the rotation angle includes making a turn, with the assembling position of the wheel at a side away from the side obstacle as the rotation center, and a sum of the linear distance between the wheel at a side away from the side obstacle and the convex point at a side of the head close to the side obstacle and the preset distance as the rotation radius. In FIGS. 1 to 3, the convex point at a side edge of the head 1 of the D-shaped robot close to the side obstacle is vertex A, and a sum of a length of a line segment LA and the preset distance is set as the rotation radius. In FIGS. 1 to 3, the wheel L is arranged at a side away from the side obstacle, that is, a position of the wheel L is set as the rotation center. In FIG. 1, the side obstacle is the linear obstacle 12; in FIG. 2, the side obstacle is the linear obstacle 22; and in FIG. 3, the side obstacle is the linear obstacle 32. In a possible embodiment of the present disclosure, the preset distance is 0 to 2 cm, so as to prevent the convex point at a side edge of the head 1 of the D-shaped robot from colliding with the obstacle. The preset distance should not be too large, so as to prevent the occurrence of a sweeping omission due to a large turning angle. In addition, different D-shaped robots have different preset distances in a case that the D-shaped robot moves along an edge or there is an obstacle in front of the D-shaped robot, so a value of the preset distance may be set according to the practical need.

Then, the side edge of the head of the D-shaped robot close to the side obstacle rotates around the rotation center by the rotation angle until it is parallel to the linear contour, and the distance between the side edge of the head close to the side obstacle and the linear contour is equal to a difference between the rotation radius and a coverage radius of the body. The coverage radius is a perpendicular distance from the rotation center to the side edge of the head of the D-shaped robot close to the side obstacle. In FIGS. 1 to 4, the rotation radius is a sum of a length D2 of the line segment LA and the preset distance, and the coverage radius of the body is a perpendicular distance from the rotation center L to the right edge of the D-shaped robot, i.e., a sum of a distance D5 and a distance D4.

Specifically, after the position of the D-shaped robot is adjusted based on the edge distance in Step S3, the right edge of the head 1 of the D-shaped robot in FIG. 1 (an edge close to the side obstacle 12) rotates around the rotation center L in a counterclockwise direction by an angle H1Ox (90°), so that the D-shaped robot is located at a position as shown in FIG. 4. At this time, the linear obstacle is indicated by 11, the positive direction of the X-axis is perpendicular to the linear contour of the obstacle 11, and the right edge of the head 1 of the D-shaped robot in FIG. 4 is parallel to the linear contour of the obstacle 11. In addition, a distance between the right edge of the head 1 of the D-shaped robot and the linear contour is equal to a difference between the rotation radius and the coverage radius of the body, so as to prevent the convex point A at the right edge of the head 1 of the D-shaped robot from colliding with the obstacle 11 during the turning to the left.

In FIG. 2, the right edge of the head 1 of the D-shaped robot (the edge close to the side obstacle 22) rotates around the rotation center L in a counterclockwise direction by an angle H22Ox (which has a value equal to an angle H23Lx), so that the D-shaped robot is located at a position as shown in FIG. 4. At this time, the linear obstacle is indicated by 21, the positive direction of the X-axis is perpendicular to the linear outline of the obstacle 21, and the right edge of the head 1 of the D-shaped robot in FIG. 4 is parallel to the linear contour of the obstacle 21. A distance between the right edge of the head 1 of the D-shaped robot and the linear contour is equal to a difference between the rotation radius and the coverage radius of the body, so as to prevent the convex point A at the right edge of the head 1 of the D-shaped robot from colliding with the obstacle 21 during the turning to the left.

In FIG. 3, the right edge of the head 1 of the D-shaped robot (the edge close to the side obstacle 32) rotates around the rotation center L in a counterclockwise direction by an angle H31Ox (which is equal to an angle H33Lx), so that the D-shaped robot is located at a position as shown in FIG. 4. At this time, the linear obstacle is indicated by 31, the positive direction of the X-axis is perpendicular to the linear outline of the obstacle 31, and the right edge of the head 1 of the D-shaped robot in FIG. 4 is parallel to the linear contour of the obstacle 31. A distance between the right edge of the head 1 of the D-shaped robot and the linear contour is equal to a difference between the rotation radius and the coverage radius of the body, so as to prevent the convex point A at the right edge of the head 1 of the D-shaped robot from colliding with the obstacle 31 during the turning to the left.

Based on the above, during the turning of the D-shaped robot, the wheel whose assembling position is set as the rotation center does not rotate, and the wheel at a side close to the side obstacle rotates around the rotation center in a preset direction by the rotation angle to reduce the perpendicular distance between the wheel and the linear contour. After the D-shaped robot rotates around the rotation center by the rotation angle, the side obstacle becomes an obstacle with a linear contour, so that the D-shaped robot starts to move along the linear contour.

As shown in FIGS. 1 and 4, during the turning to the left, a position of the left wheel of the D-shaped robot in FIG. 1 remains unchanged, and the left wheel L is not driven by an electric motor to rotate. The right wheel R of the D-shaped robot rotates by 90° around the rotation center L in a counterclockwise direction, and in this process, a perpendicular distance between the right wheel R and the linear contour of the obstacle 11 is gradually reduced, so a distance between the right edge of the head 1 and the obstacle 11 is reduced. Meanwhile, the right wheel R gradually moves away from the obstacle 12, so as to reduce a probability of colliding with the obstacle 12. After the D-shaped robot rotates around the rotation center L by 90°, the side obstacle of the D-shaped robot in FIG. 1 is changed from the obstacle 12 to the obstacle 11.

As shown in FIGS. 2 and 4, during the turning to the left, a position of the left wheel L of the D-shaped robot in FIG. 2 remains unchanged, and the left wheel L is not driven by the electric motor to rotate. The right wheel R of the D-shaped robot rotates around the rotation center L in a counterclockwise direction by an angle H23Lx, and in this process, a perpendicular distance between the right wheel R and the linear contour of the obstacle 21 is gradually reduced, so a distance between the right edge of the head 1 and the obstacle 21 is reduced. Meanwhile, the right wheel R gradually moves away from the obstacle 22, so as to reduce a probability of colliding with the obstacle 22. After the D-shaped robot rotates around the rotation center L by the angle H23Lx, the side obstacle of the D-shaped robot in FIG. 2 is changed from the obstacle 22 to the obstacle 21.

As shown in FIGS. 3 and 4, during the turning to the left, a position of the left wheel L of the D-shaped robot in FIG. 3 remains unchanged, and the left wheel L is not driven by the electric motor to rotate. The right wheel R of the D-shaped robot rotates around the rotation center L in a counterclockwise manner by an angle H33Lx, and in this process, a perpendicular distance between the right wheel R and the linear contour of the obstacle 31 is gradually reduced, so a distance between the right edge of head 1 and the obstacle 31 is reduced. Meanwhile, the right wheel R gradually moves away from the obstacle 32, so as to reduce a probability of colliding with the obstacle 32. After the D-shaped robot rotates around the rotation center L by the angle H33Lx, the side obstacle of the D-shaped robot in FIG. 3 is changed from the obstacle 32 to the obstacle 31.

In a possible embodiment of the present disclosure, before Step S3, a minimum distance between the right edge of the head of the D-shaped robot and the side obstacle in FIGS. 1 to 3 is not particularly defined, and it is also able to provide a sufficient adjustment space for the D-shaped robot even in a case that the minimum distance has a small value. The rectangular head is arranged before the semicircular body with a small width, so during the turning until the side edge of the head is parallel to the linear contour, both the body and the head may move away from the side obstacle and close to the line contour of the obstacle in front of the head. Hence, the present disclosure focuses on the adjustment of the perpendicular distance between the head or the wheel as the rotation center and the linear contour of the obstacle in front of the D-shaped robot, and a distance between the D-shaped robot and the side obstacle is not adjusted before the turning.

In an embodiment of the present disclosure, as shown in FIG. 1, in a case that the linear contour is parallel to the positive direction of the X-axis, the edge distance to be adjusted before the turning in Step S2 is equal to a difference between the rotation radius and the maximum radius of the head. In some embodiments of the present disclosure, the edge distance is equal to a distance of the point H1 detected by the line laser sensor at the front end of the head in a direction perpendicular to the wheel axle 3 (a direction parallel to the line segment OH1), i.e., a perpendicular distance from the point H1 to the front end of the head 1. The current position of the D-shaped robot in FIG. 1 is adjusted until the perpendicular distance from the front end of the head to the linear contour of the obstacle 11 is equal to the difference between the rotation radius (a sum of the length of the line segment LA and the preset distance) and the maximum radius (D3) of the head, so as to prevent the convex point A at the right edge of the head 1 from colliding with the obstacle 11 in a case that the D-shaped robot rotates to the left by 90°. The perpendicular distance from the rotation center to the front end of the head is set as the maximum radius of the head. As shown in FIG. 1, the maximum radius of the head is equal to the perpendicular distance D3 from the rotation center L to the front end of the head 1.

On one hand, in a case that the edge distance is a difference between the linear distance from the rotation center to the linear contour and the linear distance from the rotation center to the front end of the head in the direction perpendicular to the linear contour, the linear distance from the rotation center L to the linear contour in the direction perpendicular to the linear contour is adjusted to be equal to the rotation radius in Step S3, that is, the perpendicular distance from the rotation center L to the linear contour of the obstacle 11 is adjusted to be equal to the rotation radius in Step S3, and the linear distance from the rotation center L to the front end of the head in the direction perpendicular to the linear contour is adjusted to be equal to the maximum radius D3 of the head in Step S3. After setting the edge distance, the edge distance is equal to the difference between the rotation radius and the maximum radius of the head. The direction perpendicular to the linear contour is parallel to the current movement direction of the D-shaped robot, that is, the vertical direction from the rotation center to the linear contour is perpendicular to the wheel axle 3.

On the other hand, the edge distance is a difference between a linear distance from the body center of the D-shaped robot to the linear contour and a linear distance from the body center of the D-shaped robot to the front end of the head in the direction perpendicular to the wheel axle 3. In FIG. 1, the linear distance from the body center of the D-shaped robot to the linear contour in the direction perpendicular to the wheel axle 3 is the length D1 of the line segment OH1, and the linear distance from the body center of the D-shaped robot to the front end of the head in the direction perpendicular to the wheel axle 3 is the maximum radius D3 of the head. The linear contour is parallel to the positive direction of the X-axis, so the linear distance from the rotation center to the linear contour in the direction perpendicular to the linear contour is equal to the length D1 of the line segment OH1, and the linear distance from the rotation center to the front end of the head in the direction perpendicular to the linear contour is equal to the maximum radius D3 of the head. The direction perpendicular to the linear contour is parallel to the direction perpendicular to the wheel axle 3. In a case that the edge distance is a difference between the linear distance from the body center of the D-shaped robot to the linear contour and the linear distance from the body center of the D-shaped robot to the front end of the head in the direction perpendicular to the wheel axle 3, the difference is adjusted to be equal to the rotation radius in Step S3. In other words, in Step S3, the movement of the D-shaped robot is controlled to adjust the perpendicular distance from the rotation center L to the linear contour of the obstacle 11 to be equal to the rotation radius, and adjust the linear distance from the rotation center L to the front end of the head in the direction perpendicular to the wheel axle 3 to be equal to the maximum radius D3 of the head. After the adjustment of the edge distance of the head, the edge distance is equal to the difference between the rotation radius and the maximum radius D3 of the head.

In an embodiment of the present disclosure, as shown in FIG. 2, in a case that the second detection angle is an acute angle, i.e., in a case that the angle between the linear contour H23H21 and the positive direction of the X-axis is an acute angle, the angle H22Ox (which is equal to H23Lx) has a value equal to a sum of the second detection angle and 90°. In Step S2, the edge distance for the head is calculated as follows.

Based on a trigonometric function relationship in FIG. 2, a product of a half of a length of the wheel axle 3 (twice a length of the line segment LO) (distance D5) and a sine value of the second detection angle (an angle between the linear contour H23H21 and the positive direction of the X-axis) is taken as a first perpendicular distance, so as to obtain a projection distance of a line segment LO in the direction perpendicular to the linear contour (in a direction from O to the point H22, or in a direction from the rotation center L to the point H23). A linear distance detected by the line laser sensor between the point H21 and the body center in the direction perpendicular to the wheel axle 3 (a direction from the point O to the point H21, or a vertical direction from the point H21 to the front end of the head 1) is marked as D7, and a linear distance between the point of the obstacle in the direction perpendicular to the wheel axle 3 and the body center is marked as a central detection distance OH21. The point of the obstacle in the direction perpendicular to the wheel axle 3 is located on the line segment H21H23 of the linear contour, and the line segment H21H23 is also called as the linear contour H21H23. The body center O is recorded and updated by the D-shaped robot in real time, and it indicates a current position of the D-shaped robot. Specifically, a sum of the distance between the point H21 and the front end of the head detected by the line laser sensor in the direction perpendicular to the wheel axle 3 and the maximum radius D3 of the head is the linear distance between the point H21 and the body center O in the direction perpendicular to the wheel axle 3 (a direction from the point O to the point H21 in FIG. 2) detected by the line laser sensor. In a case that coordinates of the point H21 is determined, coordinates of the body center O may be calculated based on the sum of the distance between the point H21 and the front end of the head and the maximum radius D3 of the head. In addition, the line segment H21H23 is a line obtained by fitting point clouds, and it is used to indicate a position of the linear contour of the obstacle 21.

Then, a product of the central detection distance OH21 and a cosine value of the second detection angle is taken as a second perpendicular distance. Based on the triangular geometric relationship, the second detection angle is equal to the angle H21OH22, and the product of the central detection distance OH21 and the cosine value of the second detection angle, i.e., the second perpendicular distance, is equal to a length of the line segment OH22. The difference between the second perpendicular distance and the first perpendicular distance is set as the perpendicular distance from the rotation center L to the linear contour H21H23, i.e., a length of a line segment LH23 in FIG. 2. At the same time, a ratio of the maximum radius D3 of the head to the cosine value of the second detection angle is set as the linear distance from the rotation center L to the front end of the head in the direction perpendicular to the linear contour H21H23. The second detection angle is also equal to the angle between the side edge of the head 1 and the line segment LH23, and the perpendicular distance from the rotation center L to the front end of the head 1 is the maximum radius D3 of the head.

It should be appreciated that, in a case that the D-shaped robot moves linearly or equivalently linearly in Step S3 and the obstacle including the linear contour H21H23 is stationary, the perpendicular distance from the rotation center L to the linear contour H21H23 changes along with the central detection distance OH21. A length of the wheel axle for calculating the perpendicular distance from the rotation center L to the linear contour H21H23, and the second detection angle remain unchanged. The maximum radius D3 of the head remains unchanged during the linear movement of the D-shaped robot, so the linear distance from the rotation center L to the front end of the head remains unchanged in the direction perpendicular to the linear contour H21H23, and the perpendicular distance D3 from the body center O of the D-shaped robot to the front end of the head remains unchanged. The D-shaped robot may calculate the perpendicular distance from the rotation center L to the linear contour H21H23 based on the change in the central detection distance OH21 in Step S3, and adjust its current position in real time based on the perpendicular distance, so as to determine the edge distance for the head before the turning. The adjustment may be performed through, but not limited to, moving forward or backward, or the adjustment may be performed based on the different speeds of the left and right wheels.

Hence, in a case that the difference between the linear distance from the rotation center to the linear contour and the linear distance from the rotation center to the front end of the head is taken as the edge distance in the direction perpendicular to the linear contour, that is, the edge distance is set in the direction perpendicular to the linear contour H23H21, the perpendicular distance from the rotation center L to the linear contour H21H23 is equal to the rotation radius (in Step S2, in a case that the D-shaped robot does not move and it is assumed that the perpendicular distance from the rotation center L to the linear contour H21H23 is equal to the rotation radius, it is able to determine the position information about the linear contour, e.g., the central detection distance OH21, and the distance between the point H21 and the front end of the head), a difference between the linear distance from the rotation center to the linear contour and the linear distance from the rotation center to the front end of the head is calculated in the direction perpendicular to the linear contour, and then the difference is taken as the edge distance for the head to be adjusted before the turning, so as to turn the D-shaped robot in such a manner that the side edge of the head is parallel to the linear contour without colliding with the linear obstacle. In FIG. 4, the positive direction of the X-axis is perpendicular to the obstacle 11, and the edge distance to be adjusted before the turning is equal to the difference between the rotation radius and a coverage distance of the head. The coverage distance of the head is a linear distance from the rotation center L to the boundary AB of the head 1 in the direction perpendicular to the linear contour H21H23, i.e., a length of a part of the line segment OH22 crossing the head 1.

Based on the above, the edge distance is the difference between the linear distance from the rotation center to the linear contour and the linear distance from the rotation center to the front end of the head in the direction perpendicular to the linear contour. Before the turning in Step S3, the D-shaped robot adjusts its position until the line laser sensor at the front end of the head detects a first target distance in the direction perpendicular to the wheel axle. The first target distance is a perpendicular distance from the point H21 to the boundary AB of the head 1 in FIG. 2, and it is equal to a difference between a length D7 of the line segment OH21 and a length D3 of the maximum radius of the head. The first target distance is calculated as follows. A product of a half of the length of the wheel axle 3 and a tangent value of the second detection angle is taken as a first distance, a sum of a ratio of the rotation radius to the cosine value of the second detection angle and the first distance is obtained, and then the maximum radius D3 of the head is subtracted from the sum to obtain the first target distance. The first target distance is used to indicate the edge distance between the front end of the head 1 and the linear contour in a case that the perpendicular distance from the rotation center L to the linear contour is equal to the rotation radius. The sum of the first distance and the ratio of the rotation radius to the cosine value of the second detection angle is equal to the central detection distance. In FIG. 2, the distance detected by the line laser sensor in the direction perpendicular to the wheel axle 3 is the perpendicular distance from the point H21 to the front end of the head 1 (specifically the boundary AB) in the direction perpendicular to the wheel axle 3, which is equal to the difference between the central detection distance D7 and the maximum radius D3 of the head.

Specifically, in FIG. 2, a length of the line segment OH21 is equal to a ratio of a length of the line segment OH22 to the cosine value of the second detection angle, so a length of the line segment LH23 is added to the product of a half of the length D5 of the wheel axle 3 and the sine value of the second detection angle to obtain the length of the line segment OH22. Next, a ratio of the length of the line segment OH22 to the cosine value of the second detection angle is calculated to obtain the length D7 of the line segment OH21. Then, the maximum radius of the head is subtracted from the length D7 of the line segment OH21 to obtain the first target distance. Illustratively, as shown in FIG. 2, the first distance is equal to a ratio of the product of a half of the length D5 of the wheel axle 3 and the sine value of the second detection angle to the cosine value of the second detection angle, and the ratio of the rotation radius to the cosine value of the second detection angle is equal to the ratio of the length of the line segment LH23 to the cosine value of the second detection angle. Hence, the sum of the ratio of the rotation radius to the cosine value of the second detection angle and the first distance is equal to a ratio of a sum of the length of the line segment LH 23 and the product of a half of the length D5 of the wheel axle 3 and the sine value of the second detection angle to the cosine value of the second detection angle.

In FIG. 2, in Step S3, the adjusting the position of the D-shaped robot based on the edge distance includes: in a case that the D-shaped robot moves to a position where the perpendicular distance from the convex point at one side of the head of the D-shaped robot to the linear contour is equal to the preset distance and the second detection angle is an acute angle, triggering the D-shaped robot to avoid the obstacle. At this time, in FIG. 2, a perpendicular distance from a convex point B at a left side of the head to the linear contour H21H23 is equal to the preset distance, an angle between the linear contour H21H23 obtained through fitting and the positive direction of the X-axis is equal to the second detection angle, i.e., an angle between the linear contour H21H23 and the boundary AB of the head 1, and the side edge of the head of the D-shaped robot is parallel to the linear obstacle 22. The D-shaped robot starts to move backward by a first preset anti-collision distance. To be specific, the D-shaped robot performs a preset action to move backward, e.g., it moves backward by means of different rotation speeds of the left and right wheels. The first preset anti-collision distance is equal to a difference between the first target distance and a first preset perpendicular distance, so as to prevent the convex point at one side of the head from colliding with the linear contour during the turning. The first preset perpendicular distance is equal to a sum of a ratio of the preset distance to the cosine value of the second detection angle and the first distance. In a case that a minimum linear distance from the convex point at one side of the head to the linear contour is the preset distance, the first preset perpendicular distance is reserved in the vertical direction from the convex point at the other side of the head to the linear contour, and the first preset perpendicular distance is greater than the preset distance to prevent the D-shaped robot from colliding with the linear contour. In a possible embodiment of the present disclosure, the preset distance is 1 cm to 2 cm. A relationship between the first preset perpendicular distance and the preset distance is obtained based on the functional relationship of the second detection angle. Specifically, a ratio of the first preset perpendicular distance to the tangent value of the second detection angle is equal to a sum of the ratio of the preset distance to the sine value of the second detection angle and a half of the length of the wheel axle.

In another embodiment of the present disclosure, as shown in FIG. 3, in a case that the second detection angle is an obtuse angle, that is, in a case that the angle between the linear contour H33H31 and the positive direction of the X-axis is an obtuse angle, the angle H31Ox (which is equal to the angle H33Lx and the angle H33LO) has a value equal to a difference obtained by subtracting 90° from the second detection angle. In step S2, the calculating the edge distance for the head includes the following steps.

Based on the trigonometric function relationship in FIG. 3, a product of a half of the length of the wheel axle 3 (distance D5) and the sine value of the second detection angle (the angle between the linear contour H33H31 and the positive direction of the X-axis) is taken as a third perpendicular distance, so as to obtain a projection distance of the line segment LO in a direction perpendicular to the linear contour (in a direction from the rotation center L to the point H33). The perpendicular distance LH33 from the rotation center L to the linear contour is greater than the perpendicular distance OH31 from the body center O to the linear contour. A linear distance detected by the line laser sensor between the point H32 and the body center O in the direction perpendicular to the wheel axle 3 (a direction from the point O to the point H32) is marked as D8, and a linear distance between the point of the obstacle in the direction perpendicular to the wheel axle 3 and the body center is marked as a central detection distance OH32. The point of the obstacle in the direction perpendicular to the wheel axle 3 is located on the line segment H31H33 of the linear contour. A sum of the distance between the point H32 and the front end of the head detected by the line laser sensor in the direction perpendicular to the wheel axle 3 (a direction from the point O to the point H32 in FIG. 3) and the maximum radius D3 of the head is equal to the linear distance between the point H32 and the body center O in the direction perpendicular to the wheel axle 3. In a case that coordinates of the point H32 are determined, coordinates of the body center O may be calculated based on the sum of the distance between the point H32 and the front end of the head and the maximum radius D3 of the head. In addition, the line segment H33H31 is a line obtained by fitting point clouds, and it is used to indicate a position of the linear contour of the obstacle 31.

Then, a product of the central detection distance OH32 and the cosine value of the second detection angle is taken as a fourth perpendicular distance. Based on the triangular geometric relationship, the second detection angle is a difference between the angle H310H32 and 180°. The product of the central detection distance OH32 and the cosine value of the second detection angle is equal to a length of the line segment OH31, that is, the fourth perpendicular distance is equal to the length of the line segment OH31. Then, a sum of the fourth perpendicular distance and the third perpendicular distance is taken as a perpendicular distance from the rotation center L to the linear contour H31H33, i.e., a length of the line segment LH33 in FIG. 3. At the same time, a ratio of the maximum radius D3 of the head to the sine value of the second detection angle is set as a linear distance from the rotation center L to the front end of the head in the direction perpendicular to the linear contour H31H33. The second detection angle is also equal to the angle between the side edge of the head 1 and the line segment LH33, and the perpendicular distance from the rotation center L to the front end of the head 1 is the maximum radius D3 of the head.

It should be appreciated that, in a case that the D-shaped robot moves linearly or equivalently linearly in Step S3 and the obstacle including the linear contour H31H33 is stationary, the perpendicular distance from the rotation center L to the linear contour H31H33 changes along with the central detection distance OH32. A length D5 of the wheel axle for calculating the perpendicular distance from the rotation center L to the linear contour H31H33, and the second detection angle remain unchanged. The maximum radius D3 of the head remains unchanged during the linear movement of the D-shaped robot, so the linear distance from the rotation center L to the front end of the head remains unchanged in the direction perpendicular to the linear contour H31H33, and the linear distance D3 from the body center of the D-shaped robot to the front end of the head remains unchanged in the direction perpendicular to the wheel axle. The D-shaped robot may calculate the perpendicular distance from the rotation center L to the linear contour H31H33 based on the change in the central detection distance OH32, and adjust its current position in real time based on the perpendicular distance, so as to determine the edge distance for the head before the turning. The adjustment may be performed through, but not limited to, moving forward or backward linearly, or the adjustment may be performed based on the different speeds of the left and right wheels.

Hence, in a case that the difference between the linear distance from the rotation center to the linear contour and the linear distance from the rotation center to the front end of the head is taken as the edge distance in the direction perpendicular to the linear contour, that is, the edge distance is set in the direction perpendicular to the linear contour H33H31, the perpendicular distance from the rotation center L to the linear contour H31H33 is equal to the rotation radius (in Step S2, in a case that the D-shaped robot does not move and it is assumed that the perpendicular distance from the rotation center L to the linear contour H31H33 is equal to the rotation radius, it is able to determine the position information about the linear contour, e.g., the central detection distance OH32, and the distance between the point H32 and the front end of the head), a difference between the linear distance from the rotation center to the linear contour and the linear distance from the rotation center to the front end of the head is calculated in the direction perpendicular to the linear contour, and then the difference is taken as the edge distance for the head to be adjusted before the turning, so as to turn the D-shaped robot in such a manner that the side edge of the head is parallel to the linear contour without colliding with the linear obstacle. In FIG. 4, the positive direction of the X-axis is perpendicular to the obstacle 31, and the edge distance to be adjusted before the turning is equal to the difference between the rotation radius and the coverage distance of the head. The coverage distance of the head is a linear distance from the rotation center L to the boundary AB of the head 1 in the direction perpendicular to the linear contour H31H33, i.e., a length of a portion of the line segment OH33 crossing the head 1.

Based on the above, in a case that the edge distance is the difference between the linear distance from the rotation center to the linear contour and the linear distance from the rotation center to the front end of the head in the direction perpendicular to the linear contour, before the turning in Step S3, the D-shaped robot adjusts its position until the line laser sensor at the front end of the head detects a second target distance in the direction perpendicular to the wheel axle. The second target distance is a difference between the central detection distance and the maximum radius of the head, i.e., a perpendicular distance from the point H32 to the boundary AB of the head 1 in FIG. 3, and it is equal to a difference between a length D8 of the line segment OH32 and the length D3 of the maximum radius of the head. The second target distance is calculated as follows. A product of a half of the length of the wheel axle 3 and the tangent value of the second detection angle is taken as a second distance, the second distance is subtracted from a ratio of the rotation radius to the cosine value of the second detection angle, and then the maximum radius of the head is subtracted from a resultant difference to obtain the second target distance. The second target distance is used to indicate the edge distance between the front end of the head and the linear contour in a case that the perpendicular distance from the rotation center L to the linear contour is equal to the rotation radius. The distance detected by the line laser sensor in the direction perpendicular to the wheel axle is the perpendicular distance from the point on the linear contour to the front end of the head in the direction perpendicular to the wheel axle 3, and the difference obtained by subtracting the second distance from the ratio of the rotation radius to the cosine value of the second detection angle is equal to the central detection distance. In FIG. 3, the distance detected by the line laser sensor in the direction perpendicular to the wheel axle 3 is the perpendicular distance from the point H32 to the front end of the head 1 (specifically the boundary AB) in the direction perpendicular to the wheel axle 3, which is equal to the difference between the central detection distance D8 and the maximum radius D3 of the head.

Specifically, in FIG. 3, a length of the line segment OH32 is equal to a ratio of a length of the line segment OH31 to the sine value of the first detection angle, so the product of a half of the length D5 of the wheel axle 3 and the sine value of the second detection angle is subtracted from a length of the line segment LH33 to obtain the length of the line segment OH31. Next, a ratio of the length of the line segment OH31 to the sine value of the first detection angle is calculated to obtain the length D8 of the line segment OH32. Then, the maximum radius D3 of the head is subtracted from the length D8 of the line segment OH32 to obtain the second target distance. Illustratively, as shown in FIG. 3, the second distance is equal to a ratio of the product of a half of the length D5 of the wheel axle 3 and the sine value of the second detection angle to the sine value of the first detection angle, and the ratio of the rotation radius to the cosine value of the second detection angle is equal to the ratio of the length of the line segment LH33 to the sine value of the first detection angle. Hence, the difference between the ratio of the rotation radius to the cosine value of the second detection angle and the second distance is equal to a ratio of a difference obtained by subtracting the product of a half of the length D5 of the wheel axle 3 and the sine value of the second detection angle from the length of the line segment LH33 to the sine value of the first detection angle.

As shown in FIG. 3, in Step S3, the adjusting the position of the D-shaped robot based on the edge distance includes: in a case that the D-shaped robot moves to a position where the perpendicular distance from the convex point at one side of the head of the D-shaped robot to the linear contour is equal to the preset distance and the second detection angle is an obtuse angle, triggering the D-shaped robot to avoid the obstacle. At this time, in FIG. 3, the perpendicular distance from the convex point A at a left side of the head to the linear contour H31H33 is equal to the preset distance, an angle between the linear contour H31H33 obtained through fitting and the positive direction of the X-axis is equal to the second detection angle, i.e., an angle between the linear contour H31H33 and the boundary AB of the head 1, and the side edge of the head of the D-shaped robot is parallel to the linear obstacle 32. The D-shaped robot starts to move backward by a first preset anti-collision distance. To be specific, the D-shaped robot performs a preset action to move backward, e.g., it moves backward by means of different rotation speeds of the left and right wheels. The first preset anti-collision distance is equal to a difference between the second target distance and a second preset perpendicular distance, so as to prevent the convex point at one side of the head from colliding with the linear contour during the turning. The second preset perpendicular distance is equal to a difference between a ratio of the preset distance to the cosine value of the second detection angle and the second distance. In a case that a minimum linear distance from the convex point at one side of the head to the linear contour is the preset distance, the second preset perpendicular distance is reserved in the vertical direction from the convex point at the other side of the head to the linear contour, and the second preset perpendicular distance is greater than the preset distance to prevent the D-shaped robot from colliding with the linear contour. In a possible embodiment of the present disclosure, the preset distance is 1 cm to 2 cm. A relationship between the second preset perpendicular distance and the preset distance is obtained based on the functional relationship of the second detection angle. Specifically, a ratio of the second preset perpendicular distance to the tangent value of the second detection angle is equal to a sum of the ratio of the preset distance to the sine value of the second detection angle and a half of the length of the wheel axle.

Based on the above, the D-shaped robot moves backward by the first preset anti-collision distance as follows.

In order to increase a distance between the side obstacle and a side of the head close to the side obstacle, the D-shaped robot controls the wheel at a side close to the side obstacle to move backward until an angle between a current position of the wheel axle and a position of the wheel axle before the adjustment reaches a preset angle, and then controls the wheel at the other side (the wheel away from the side obstacle) to move backward until a current position of the wheel axle is parallel to the position of the wheel axle before the adjustment, so as to adjust the distance between the side edge of the D-shaped robot and the side obstacle. During the movement, the convex points at both sides of the head move away from the linear contour in turn. Specifically, in FIGS. 1 to 3, the D-shaped robot controls the right wheel R to move backward until the angle between the current position of the wheel axle 3 and the position of the wheel axles 3 before the adjustment reaches the preset angle, and then controls the left wheel L to move backward until the current position of the wheel axle 3 is parallel to the position of the wheel axle before the adjustment, so as to enable the D-shaped robot to move to the left by one side edge (taking the right edge in FIG. 4 as an example). Based on the triangular geometric relationship, in this embodiment of the present disclosure, an inverse cosine value of a ratio of a difference between the length of the wheel axle and the edge distance to the length of the wheel axle is set as the preset angle.

After adjusting the distance between the side edge of the D-shaped robot and the side obstacle, a change value of the linear distance from the body center O of the D-shaped robot to the linear contour in the direction perpendicular to the wheel axle 3 (a direction parallel to the current movement direction, or perpendicular to the boundary AB) is calculated, and then the first preset anti-collision distance is subtracted from the change value to obtain a position adjustment value. The change value is equal to a product of the length of the wheel axle and a sine value of the preset angle. Then, whether or not the position adjustment value is greater than 0 is determined. In a case that the position adjustment value is greater than 0, it means that a distance between the D-shaped robot and the linear contour of the obstacle in front of the D-shaped robot is too large, and the D-shaped robot moves forward by the position adjustment value. In a case that the position adjustment value is less than 0, it means that the distance between the D-shaped robot and the linear contour of the obstacle in front of the D-shaped robot is too small, and the D-shaped robot moves backward by the position adjustment value. In a case that the position adjustment value is equal to 0, it means that the adjustment of the edge distance between the head of the D-shaped robot and the linear contour is completed, and there is an enough space for the D-shaped robot to make a turn. At this time, the D-shaped robot rotates to the left based on the rotation angle calculated in Step S1 (taking the right edge in FIG. 4 as an example) so as to be aligned with the obstacle in front of the D-shaped robot, i.e., the D-shaped robot makes a turn so that the side edge of the head is parallel to the linear contour and then moves along the linear contour. According to the method in the embodiments of the present disclosure, it is able to prevent the D-shaped robot from directly colliding with the linear obstacle in front of the D-shaped robot due to an insufficient space.

The sum of the linear distance between the body center of the D-shaped robot and the convex point at one side of the head and the preset distance is set as a largest side-to-center distance, i.e., the linear distance between point O and point Ain FIGS. 1 to 3, and the side-to-center distance is used to indicate a perpendicular distance to be maintained from the body center of the D-shaped robot to the side obstacle (the obstacle 12 in FIG. 1, the obstacle 22 in FIG. 2, or the obstacle 32 in FIG. 3) in a case that the D-shaped robot turns backward. An inverse cosine value of a ratio of a half of the width D4 of the body to the largest side-to-center distance OA is set as a reference turning angle. The reference turning angle is less than 90°, and a deflection angle of the line segment OA relative to the positive direction of the X-axis is less than 90°. An angle corresponding to an angle difference between the reference turning angle and the first detection angle is an angle between the line segment OH31 and the line segment OA in FIG. 3.

Specifically, the distance between the edge of the D-shaped robot and the side obstacle is calculated as follows. In a case that the first detection angle is greater than or equal to 90°, the distance is equal to a difference between the largest side-to-center distance and a half of the width of the body. In FIG. 2, the difference between the largest side-to-center distance OA and a half of the width D4 of the body is used as the distance to be adjusted between the right edge of the D-shaped robot and the obstacle 12, and after the D-shaped robot moves to a position where a distance between the side edge and the side obstacle is equal to the edge distance, the D-shaped robot rotates around the rotation center L by the reference turning angle (corresponding to an angle AOx or AOR) in a clockwise direction, and the convex point of the rectangular head 1 of the D-shaped robot does not collide with the obstacle 21. In addition, the convex point A of the rectangular head 1 of the D-shaped robot is closest to the obstacle 22, and the perpendicular distance from the convex point A to the obstacle 22 is reduced to the preset distance, i.e., the minimum perpendicular distance.

In a case that the first detection angle is smaller than the reference turning angle, the distance is equal to the difference between the largest side-to-center distance and a half of the width of the body. In FIG. 3, in a case that a large angle is formed between the obstacle 31 and the obstacle 32 and the perpendicular distance from the body center O to the obstacle 31 is greater than the largest side-to-center distance, the obstacle 31 does not collide with the convex point of the rectangular head 1 of the D-shaped robot during the rotation. Hence, the distance is set to be equal to the difference between the largest side-to-center distance and a half of the width of the body. After the D-shaped robot moves to a position where a distance between its side edge and the side obstacle is equal to the distance, the D-shaped robot rotates around the rotation center L by the reference turning angle in a clockwise direction, and the convex point of the rectangular head 1 of the D-shaped robot does not collide with the obstacle 31 and the obstacle 32. The perpendicular distance from the convex point A to the obstacle 32 is reduced to the preset distance, i.e., the minimum perpendicular distance from the convex point A to the obstacle 32, and the preset distance is greater than 0.

In a case that the first detection angle is smaller than 90° and the first detection angle is greater than or equal to the reference turning angle, as shown in FIG. 3, a small angle is formed between the obstacle 31 and the obstacle 32, and the convex point of the rectangular head 1 of the D-shaped robot may gradually move close to the obstacle 31 as the first detection angle increases, so that the perpendicular distance between the body center O and the obstacle 31 is smaller than the largest side-to-center distance. In a case that the difference between the largest side-to-center distance and a half of the width of the body continues to be used as the distance, the convex point of the rectangular head 1 of the D-shaped robot may collide with the obstacle during the rotation in the clockwise direction. Hence, the distance needs to be reduced. To be specific, a cosine value of an angle difference between the reference turning angle and the first detection angle is multiplied by the largest side-to-center distance to obtain a product, and then a half of the width of the body is subtracted from the product to obtain the distance. After the D-shaped robot moves to a position where a distance between the side edge and the side obstacle is equal to the distance, the D-shaped robot rotates around the rotation center L by the first detection angle in the clockwise direction, the convex point B at the left side of the rectangular head 1 does not collide with the obstacle 31, and the convex point A at the right side of the rectangular head 1 does not collide with the obstacle 32. The perpendicular distance from the convex point A to the obstacle 32 is smaller than the preset distance but not equal to 0.

In a word, according to the embodiments of the present disclosure, the line laser sensor on the D-shaped robot determines a position or the linear contour of the obstacle in front of the D-shaped robot, so as to obtain the rotation angle required for moving immediately along the linear obstacle or linear contour. In addition, the edge distance required before the turning is calculated based on the wheel as the rotation center, the linear distance between the wheel and the convex point of the head, and the perpendicular distance between the wheel and the side edge of the head, and then the position of the D-shaped robot is adjusted to obtain the perpendicular distance between the wheel and the obstacle during the turning, so as to prevent the front edge of the D-shaped robot from directly colliding with the linear contour due to a limited space. As a result, it is able to rotate the D-shaped robot to be parallel to a wall by means of different rotation speeds of left and right wheels, with less adjustment in a process of controlling the protrusion at the front edge not to collide with the obstacle. In addition, the calculation is performed substantially based on the triangular geometric relationship of the head and the body of the D-shaped robot, so a computational burden for obstacle avoidance is low.

In a possible embodiment of the present disclosure, in a case that the D-shaped robot moves along the wall, a non-linear obstacle in front of the D-shaped robot may be detected by the line laser sensor. Specifically, the non-linear obstacle includes an irregular-shaped obstacle other than wall, box or doorsill, e.g., a ball, a cylindrical leg of a table or chair, or pet excrement. In a case that the D-shaped robot moves close to this kind of obstacle, the line laser sensor may detect a part of its curved contour and mark it on the map, and then the corresponding obstacle in front of the D-shaped robot may be determined through fitting point clouds. Hence, after Step S3, the D-shaped robot may move along the linear contour while ensuring that the convex point at any side of the head does not collide with the obstacle. During the movement along the linear contour, the D-shaped robot determines a point on the obstacle closest to the body center via the line laser sensor, and marks the point as an alignment point. Then, the D-shaped robot adjusts its position until a distance between the body center and the alignment point reaches a second preset anti-collision distance. The second preset anti-collision distance is equal to a sum of the linear distance between the body center of the D-shaped robot and the convex point at a side of the head and the preset distance (at this time, the rotation center of the D-shaped robot is the body center O), so that the convex point at one side of the head does not collide with the obstacle during the turning at a position close to the obstacle or wall. Then, the D-shaped robot rotates by the preset alignment angle until the convex point at one side of the head rotates to a side of the alignment point away from the obstacle, so that the D-shaped robot bypasses the obstacle including the alignment point. Then, the D-shaped robot adjusts its movement direction and continues to move along the linear contour. The side of the alignment point away from the obstacle is located in a detection blind region of the line laser sensor.

It should be appreciated that, in order to make a turn and achieve the alignment, the D-shaped robot moves to a position where a distance between the D-shaped robot and the obstacle in front of the D-shaped robot reaches the preset distance and a point on the irregular-shaped obstacle closest to the D-shaped robot is detected. At this time, the D-shaped robot is about to collide with the obstacle. For example, in a case that the D-shaped robot does not collide with regions at both sides of the alignment point in the obstacle (including a blind region), the distance between the body center and the alignment point is adjusted to be the second preset anti-collision distance, so as to reserve a small space as possible for the rotation, i.e., enable the D-shaped robot to move at a position close to the obstacle as possible but the protrusion at the front side (the convex point A at the right edge of the head in FIG. 4) does not collide with the obstacle. At this time, in a case that the assembling position of the wheel at one side is selected as the rotation center and the position of the D-shaped robot is adjusted so that the distance between the rotation center and the alignment point reaches the rotation radius (which is equal to a sum of the linear distance between the wheel away from the side obstacle (as the rotation center) and the convex point of the head close to the side obstacle and the preset distance), the D-shaped robot needs to rotate by an angle greater than a rotation angle to be rotated in a case that the distance between the body center and the alignment point is the second preset anti-collision distance. In addition, there is a relatively large detection blind region at one side of the obstacle (as compared with the linear obstacle which is easily identified and the linear contour of which is easily obtained through fitting). Hence, after the D-shaped robot adjusts its position so that the distance between the rotation center and the alignment point reaches the rotation radius, the D-shaped robot may easily collide with the irregular-shaped obstacle in front of the D-shaped robot during the turning with the assembling position of the wheel as the rotation center. In the embodiments of the present disclosure, after the D-shaped robot has detected the irregular-shaped obstacle, it adjusts the position so that the distance between the body center and the alignment point is the second preset anti-collision distance. Then, the D-shaped robot rotates by the preset alignment angle, so that the convex point at one side of the head is aligned with the alignment. In this way, it is able to make a turn and achieve the alignment at a small angle.

Based on the above, in a case that the distance between the body center of the D-shaped robot and the alignment point reaches the second preset anti-collision distance, a connection line between the body center and the alignment point is marked as a first target line segment, and a connection line between the body center and the convex point at a side of a detected region is marked as a second target line segment. The detected region is a region which has been scanned by the line laser sensor. During the rotation, the preset alignment angle is an angle between the first target line segment and the second target line segment. The D-shaped robot rotates from the convex point at a side of the detected region toward the alignment point, so that the convex point at one side of the head moves to a side of the alignment point away from the obstacle in a case of not colliding with the obstacle.

Hence, for the detected non-linear obstacle, a posture of the D-shaped robot is adjusted so that the side edge of the D-shaped robot is aligned with the obstacle, and the distance is adjusted appropriately to avoid the obstacle in real time. Before triggering the turning of the D-shaped robot, the line laser sensor may scan a part of the obstacle, mark points in a map, and determine that the corresponding point of the obstacle aligned with the D-shaped robot is closest to the D-shaped robot. Then, the position of the D-shaped robot is adjusted based on the point, so that the convex point at a side of the head does not collide with the obstacle during the turning. Especially, in a case that there is a blind region at one side of the obstacle and the alignment is completed, it is able to determine a region where no collision may occur, thereby to enable the D-shaped robot to avoid the detected non-linear obstacle in a case that the line laser sensor performs the scanning subsequently and determines that there is no risk of collision in the blind region.

It should be appreciated that, after the D-shaped robot is aligned with the obstacle, the D-shaped robot determines the position of the obstacle using the point cloud data generated by the line laser sensor at one side of the D-shaped robot close to the obstacle to determine the position of the obstacle and avoid the obstacle during the movement. The point cloud data collected by the line laser sensor includes discrete points on the obstacle close to the D-shaped robot, and each discrete point may be mapped to a map coordinate system. In a case that an origin of the map coordinate system is selected as the body center O, a linear distance between each discrete point and the body center O is calculated based on coordinates of the discrete point in the map coordinate system, and this linear distance indicates the distance between the contour line of the obstacle and the side edge of the D-shaped robot. At the same time, the D-shaped robot uses the line laser sensor to scan environment information about the blind region at one side of the alignment point of the obstacle, e.g., a region at a left side of the alignment point (which is not detected before the rotation), so as to avoid the other obstacle in the blind region. In this way, it is able to scan the other possible obstacles in the region at the left side of the alignment point using the method after Step S3, thereby to avoid the obstacles in real time.

It should be appreciated that, in the embodiments of the present disclosure, the system, device and method may be implemented in any other ways. For example, the device embodiments are merely for illustrative purposes, and the units are provided merely on the basis of the logic functions. During the implementation, some units or assemblies may be combined together or integrated into another system, or some features may be omitted or not executed. In addition, the displayed or discussed coupling connection, direct coupling connection or communication connection between the units may be implemented via interfaces, and the indirect coupling connection or communication connection between the devices or units may be implemented in an electrical or mechanical form or in any other form. The units as separate components may be, or may not be, separated from each other physically, and the components may be, or may not be, physical units. They may be located at an identical position, or distributed over a plurality of network elements. All or a part of the components may be selected according to the practical need so as to achieve the object of the present disclosure.

It should be further appreciated that, all or a part of the processes in the above-mentioned method may be implemented through relevant hardware under the control of a computer program. The computer program may be stored in a non-volatile computer-readable storage medium, and when the computer program is executed, it includes the processes of the above-mentioned method. In addition, references to memory, storage, database or any other media may include a non-volatile memory and/or a volatile memory. The non-volatile memory may include read-only memory (ROM), programmable memory (PROM), electrically programmable read-only memory (EPROM), electrically erasable programmable read-only memory (EEPROM), or flash memory. The volatile memory may include random access memory (RAM) or external high-speed buffer memory.

The technical features in the embodiments of the present disclosure may be combined in any way. For clarification, not all possible combinations have been described in the embodiments of the present disclosure. However, these combinations shall also fall within the scope of the present disclosure in the case of no conflict.

The above embodiments are for illustrative purposes only, but shall not be construed as limiting the scope of the present disclosure. It should be appreciated that, a person skilled in the art may further make improvements and modifications without departing from the principle of the present disclosure, and these improvements and modifications shall also fall within the scope of the present disclosure.

What is claimed is:

1. A turning control method for a D-shaped robot based on an obstacle contour, comprising:

Step S1: extracting, by the D-shaped robot, a linear contour of an obstacle in front of the D-shaped robot using a line laser sensor, and calculating a rotation angle for turning a side edge of a head of the D-shaped robot to be parallel to the linear contour based on the linear contour;

Step S2: calculating an edge distance to be adjusted for the head before turning based on the rotation angle and a body size parameter of the D-shaped robot, wherein the edge distance is a difference between a linear distance from a rotation center for turning the D-shaped robot to the linear contour and a linear distance from the rotation center to a front end of the head in a direction perpendicular to the linear contour; and Step S3: adjusting a position of the D-shaped robot based on the edge distance, and making a turn based on the rotation angle until the side edge of the head is parallel to the linear contour, wherein the D-shaped robot comprises the head of a rectangular shape, a semicircular body and two symmetrical wheels, the two symmetrical wheels are coupled to each other via a wheel axle, the wheel axle is arranged at a boundary between the head and the semicircular body, and the two symmetrical wheels comprise a wheel at a side close to a side obstacle and a wheel at a side away from the side obstacle;

a body center of the D-shaped robot is a center of the wheel axle, a convex point at a side edge of the head of the D-shaped robot is a vertex at a side of a front end of head, the front end of the head faces a movement direction of the D-shaped robot;

a rotation center for turning the D-shaped robot to left is set at an assembling position of a left wheel of the D-shaped robot, or a rotation center for turning the D-shaped robot to right is set at an assembling position of a right wheel of the D-shaped robot;

wherein in Step S3, the making a turn based on the rotation angle comprises:

taking an assembling position of the wheel at a side away from the side obstacle as the rotation center, and setting a sum of a linear distance between the wheel at a side away from the side obstacle and the convex point at the side edge of the head of the D-shaped robot close to the side obstacle and a preset distance as a rotation radius; and rotating the D-shaped robot around the rotation center by the rotation angle until the side edge of the head of the D-shaped robot close to the side obstacle is parallel to the linear contour, and determining that a distance between the side edge of the head of the D-shaped robot close to the side obstacle and the linear contour is equal to a difference between the rotation radius and a coverage radius of the body, wherein the coverage radius of the body is equal to a perpendicular distance from the rotation center to the side edge of the head of the D-shaped robot close to the side obstacle.

2. The turning control method according to claim 1, wherein a width of the semicircular body is equal to a length of a contour line of the head parallel to the wheel axle, a maximum perpendicular distance from an edge of the semicircular body to the wheel axle is a maximum radius of the body, and the maximum radius of the body is greater than or equal to a half of the width of the body;

and a perpendicular distance from the rotation center to the front end of the head is set as a maximum radius of the head.

3. The turning control method according to claim 2, wherein Step S1 comprises:

obtaining, by the D-shaped robot, point cloud data of the obstacle in front of the D-shaped robot via the line laser sensor, and performing linear fitting on the point cloud data using a least square method to obtain the linear contour, wherein the linear contour is a line indicating a position of the obstacle in front of the D-shaped obstacle; and setting an angle between a vertical line perpendicular to the linear contour and a positive direction of an X-axis as the rotation angle for turning the side edge of the head of the D-shaped robot to be parallel to the linear contour;

wherein the positive direction of the X-axis faces the side obstacle and is perpendicular to the side edge of the head of the D-shaped robot, the positive direction of the X-axis is parallel to the wheel axle, and in a case that the side edge of the head of the D-shaped robot is parallel to the linear contour, the linear contour is perpendicular to the positive direction of the X-axis.

4. The turning control method according to claim 3, wherein an angle between the linear contour and the positive direction of the X-axis is obtained through:

calculating a slope of the linear contour based on any two points on the linear contour, and converting the slope of the linear contour into the angle between the linear contour and the positive direction of the X-axis using an arctangent function.

5. The turning control method according to claim 4, wherein the angle between the vertical line and the positive direction of the X-axis is set as a first detection angle and the angle between the linear contour and the positive direction of the X-axis is set as a second detection angle;

in a case that the second detection angle is an obtuse angle, the first detection angle is equal to a difference obtained by subtracting 90° from the second detection angle;

in a case that the second detection angle is an acute angle, the first detection angle is equal to a sum of the second detection angle and 90°; and in a case that the linear contour is parallel to the positive direction of the X-axis, the first detection angle is equal to 90°.

6. The turning control method according to claim 1, wherein during the turning, the wheel whose assembling position is set as the rotation center does not rotate, and the wheel at a side close to the side obstacle rotates around the rotation center by the rotation angle in a preset direction to reduce a perpendicular distance between the wheel and the linear contour; and after the D-shaped robot rotates around the rotation center by the rotation angle, the side obstacle becomes an obstacle where the linear contour is located, and the D-shaped robot starts to move along the linear contour.

7. The turning control method according to claim 1, wherein in a case that the linear contour is parallel to the positive direction of the X-axis, the edge distance to be adjusted before the turning in Step S2 is equal to a difference between the rotation radius and the maximum radius of the head;

in a case that the edge distance is a difference between the linear distance from the rotation center to the linear contour and the linear distance from the rotation center to the front end of the head in the direction perpendicular to the linear contour, the linear distance from the rotation center to the linear contour in the direction perpendicular to the linear contour is adjusted to be equal to the rotation radius in Step S3, and the linear distance from the rotation center to the front end of the head in the direction perpendicular to the linear contour is adjusted to be equal to the maximum radius of the head in Step S3; and a direction perpendicular to the wheel axle is parallel to a current movement direction of the D-shaped robot.

8. The turning control method according to claim 1, wherein in a case that the second detection angle is an acute angle, the calculating the edge distance in Step S2 comprises:

calculating a product of a half of a length of the wheel axle and a sine value of the second detection angle as a first perpendicular distance;

calculating a linear distance between a point of the obstacle in the direction perpendicular to the wheel axle and the body center of the D-shaped robot as a central detection distance, wherein the point of the obstacle in the direction perpendicular to the wheel axle is located on a line segment where the linear contour is located;

calculating a product of the central detection distance and a cosine value of the second detection angle as a second perpendicular distance;

calculating a difference between the second perpendicular distance and the first perpendicular distance as the perpendicular distance from the rotation center to the linear contour in the direction perpendicular to the linear contour, and calculating a ratio of the maximum radius of the head to the cosine value of the second detection angle as the linear distance from the rotation center to the front end of the head in the direction perpendicular to the linear contour; and in a case that the perpendicular distance from the rotation center to the linear contour is equal to the rotation radius, calculating a difference between the linear distance from the rotation center to the linear contour and the linear distance from the rotation center to the front end of the head as the edge distance in the direction perpendicular to the linear contour.

9. The turning control method according to claim 8, wherein before the turning in Step S3, the position of the D-shaped robot is adjusted until the line laser sensor detects a first target distance in the direction perpendicular to the wheel axle, and the first target distance is a difference between the central detection distance and the maximum radius of the head;

wherein the first target distance is obtained through:

calculating a product of a half of the length of the wheel axle and a tangent value of the second detection angle as a first distance; and calculating a sum of a ratio of the rotation radius to the cosine value of the second detection angle and the first distance, and subtracting the maximum radius of the head from the sum to obtain the first target distance, wherein the first target distance is used to indicate the edge distance between the front end of the head and the linear contour in a case that the perpendicular distance from the rotation center to the linear contour is equal to the rotation radius, and the sum of the first distance and the ratio of the rotation radius to the cosine value of the second detection angle is equal to the central detection distance;

wherein a distance detected by the line laser sensor in the direction perpendicular to the wheel axle is a perpendicular distance from a point on the linear contour to the front end of the head in the direction perpendicular to the wheel axle.

10. The turning control method according to claim 9, wherein in Step S3, the adjusting the position of the D-shaped robot based on the edge distance comprises:

in a case that the D-shaped robot moves to a position where the perpendicular distance from the convex point at the side edge of the head of the D-shaped robot to the linear contour is equal to the preset distance and the second detection angle is an acute angle, enabling the D-shaped robot to move backward by a first preset anti-collision distance;

wherein the first preset anti-collision distance is equal to a difference between the first target distance and a first preset perpendicular distance to prevent the convex point at the side edge of the head from colliding with the linear contour during the turning; and the first preset perpendicular distance is equal to a sum of a ratio of the preset distance to the cosine value of the second detection angle to the first distance.

11. The turning control method according to claim 1, wherein in a case that the second detection angle is an obtuse angle, the calculating the edge distance in Step S2 comprises:

calculating a product of a half of the length of the wheel axle and a sine value of the second detection angle as a third perpendicular distance;

calculating a linear distance between a point of the obstacle detected by the line laser sensor and the body center in the direction perpendicular to the wheel axle as a central detection distance, wherein the point of the obstacle in the direction perpendicular to the wheel axle is located on a line segment where the linear contour is located;

calculating a product of the central detection distance and a cosine value of the second detection angle as a fourth perpendicular distance;

calculating a sum of the third perpendicular distance and the fourth perpendicular distance as the linear distance from the rotation center to the linear contour in the direction perpendicular to the linear contour, and calculating a ratio of the maximum radius of the head to a sine value of the first detection angle as the linear distance from the rotation center to the front end of the head in the direction perpendicular to the linear contour; and in a case that the perpendicular distance from the rotation center to the linear contour is adjusted to be equal to the rotation radius, calculating a difference between the linear distance from the rotation center to the linear contour and the linear distance from the rotation center to the front end of the head as the edge distance in the direction perpendicular to the linear contour.

12. The turning control method according to claim 11, wherein in a case that the edge distance is the difference between the linear distance from the rotation center to the linear contour and the linear distance from the rotation center to the front end of the head in the direction perpendicular to the linear contour, before turning in Step S3, the position of the D-shaped robot is adjusted until the line laser sensor detects a second target distance in the direction perpendicular to the wheel axle, and the second target distance is a difference between the central detection distance and the maximum radius of the head;

wherein the second target distance is obtained through:

calculating a product of a half of the length of the wheel axle and a tangent value of the second detection angle as a second distance; and calculating a difference obtained by subtracting the second distance from a ratio of the rotation radius to the cosine value of the second detection angle, and subtracting the maximum radius of the head from the difference to obtain the second target distance, wherein the second target distance is used to indicate an edge distance between the front end of the head and the linear contour in a case that the perpendicular distance from the rotation center to the linear contour is equal to the rotation radius;

wherein a distance detected by the line laser sensor in the direction perpendicular to the wheel axle is a perpendicular distance from a point on the linear contour to the front end of the head, and a difference obtained by subtracting the second distance from the ratio of the rotation radius to the cosine value of the second detection angle is equal to the central detection distance.

13. The turning control method according to claim 12, wherein in Step S3, the adjusting the position of the D-shaped robot based on the edge distance comprises:

in a case that the D-shaped robot moves to a position where the perpendicular distance from the convex point at the side edge of the head of the D-shaped robot to the linear contour is equal to the preset distance and the second detection angle is an obtuse angle, enabling the D-shaped robot to move backward by a first preset anti-collision distance;

wherein the first preset anti-collision distance is equal to a difference between the second target distance and a second preset perpendicular distance to prevent the convex point at the side edge of the head from colliding with the linear contour during the turning; and the second preset perpendicular distance is equal to a difference between a ratio of the preset distance to the cosine value of the second detection angle and the second distance.

14. The turning control method according to claim 10, wherein the enabling the D-shaped robot to move backward by the first preset anti-collision distance comprises:

controlling, by the D-shaped robot, the wheel at a side close to the side obstacle to move backward until an angle between a current position of the wheel axle and a position of the wheel axle before the position adjustment reaches a preset angle, and controlling the wheel at the other side to move backward until a current position of the wheel axle is parallel to the position of the wheel axle before the position adjustment and the adjustment of a distance between the side edge of the D-shaped robot and the side obstacle is completed, wherein an inverse cosine value of a ratio of a difference between a length of the wheel axle and the distance to the length of the wheel axle is set as the preset angle;

after adjusting the distance between the side edge of the D-shaped robot and the side obstacle, calculating a change value of the linear distance from the body center of the D-shaped robot to the linear contour in the direction perpendicular to the wheel axle, and subtracting the first preset anti-collision distance from the change value to obtain a position adjustment value, wherein the change value is equal to a product of the length of the wheel axle and a sine value of the preset angle; and determining whether or not the position adjustment value is greater than 0, in a case that the position adjustment value is greater than 0, enabling the D-shaped robot to move forward by the position adjustment value, otherwise, enabling the D-shaped robot to move backward by the position adjustment value.

15. The turning control method according to claim 14, wherein the distance between the side edge of the D-shaped robot and the side obstacle is calculated through:

in a case that the first detection angle is greater than or equal to 90°, setting the distance to be equal to a difference between a largest side-to-center distance and a half of a width of the body;

in a case that the first detection angle is smaller than a reference turning angle, setting the distance to be equal to the difference between the largest side-to-center distance and a half of the width of the body; and in a case that the first detection angle is smaller than 90° and the first detection angle is greater than or equal to the reference turning angle, calculating a product of a cosine value of an angle difference between the reference turning angle and the first detection angle and the largest side-to-center distances, and subtracting a half of the width of the body from the product to obtain a difference as the distance;

wherein a sum of the linear distance between the body center of the D-shaped robot and the convex point at the side edge of the head of the D-shaped robot and the preset distance is set as the largest side-to-center distance; and an inverse cosine value of a ratio of a half of the width of the body to the largest side-to-center distance is set as the reference turning angle, and the reference turning angle is less than 90°.

* * * * *